United States Patent
Elenbaas

(10) Patent No.: US 12,325,510 B2
(45) Date of Patent: Jun. 10, 2025

(54) RETRACT ACTUATOR ASSEMBLIES, LANDING GEAR ASSEMBLIES AND METHODS FOR KNEELING LANDING GEAR ASSEMBLY OF AIRCRAFT

(71) Applicant: The Boeing Company, Arlington, VA (US)

(72) Inventor: Matthew S. Elenbaas, Springfield, PA (US)

(73) Assignee: The Boeing Company, Arlington, VA (US)

( * ) Notice: Subject to any disclaimer, the term of this patent is extended or adjusted under 35 U.S.C. 154(b) by 85 days.

(21) Appl. No.: 18/239,247

(22) Filed: Aug. 29, 2023

(65) Prior Publication Data
US 2025/0074581 A1    Mar. 6, 2025

(51) Int. Cl.
| | |
|---|---|
| *B64C 25/58* | (2006.01) |
| *B64C 25/20* | (2006.01) |
| *B64C 25/22* | (2006.01) |
| *F15B 15/24* | (2006.01) |

(52) U.S. Cl.
CPC .............. *B64C 25/20* (2013.01); *B64C 25/22* (2013.01); *B64C 25/58* (2013.01); *F15B 15/24* (2013.01)

(58) Field of Classification Search
CPC ......... B64C 25/20; B64C 25/22; B64C 25/58; F15B 15/24
See application file for complete search history.

(56) References Cited

U.S. PATENT DOCUMENTS

| | | | | |
|---|---|---|---|---|
| 3,826,450 A | * | 7/1974 | Currey | ................ B64C 25/001 |
| | | | | 280/765.1 |
| 3,954,232 A | * | 5/1976 | Harper | ................ B64C 25/001 |
| | | | | 244/102 R |
| 4,088,286 A | | 5/1978 | Masclet et al. | |
| 4,228,975 A | * | 10/1980 | Sealey | ................ B64C 25/14 |
| | | | | 244/102 R |

(Continued)

FOREIGN PATENT DOCUMENTS

| | | |
|---|---|---|
| FR | 2702446 A1 | 9/1994 |
| GB | 1488416 A | 10/1977 |
| KR | 101640666 B1 | 7/2016 |

OTHER PUBLICATIONS

European Patent Office, Extended European Search Report, App. No. 24191269.0 (Dec. 23, 2024).

*Primary Examiner* — Tye William Abell
(74) *Attorney, Agent, or Firm* — Walters & Wasylyna LLC

(57) ABSTRACT

A retract actuator assembly for a landing gear assembly of an aircraft includes a retract actuator and a kneel stop assembly. The retract actuator includes an actuator housing and a piston. The actuator housing includes a cylinder bore along a longitudinal axis. The piston disposed within the cylinder bore and configured to move within the cylinder bore. The cylinder bore defines a piston stroke with an extended piston position and a retracted piston position. The kneel stop assembly secured to the actuator housing. The kneel stop assembly is configured to selectively establish a kneel stop position within the cylinder bore to reduce the piston stroke by inhibiting movement of the piston to the retracted piston position. The landing gear assembly includes the retract actuator, the kneel stop assembly, a trailing arm and a shock absorber. A method for kneeling a landing gear assembly of an aircraft is also provided.

20 Claims, 17 Drawing Sheets

(56) References Cited

U.S. PATENT DOCUMENTS

| | | | | |
|---|---|---|---|---|
| 4,291,850 A | * | 9/1981 | Sharples | ................. B64C 25/60 |
| | | | | 244/104 FP |
| 4,907,760 A | * | 3/1990 | Sealey | .................... B64C 25/60 |
| | | | | 244/102 R |
| 2008/0201026 A1 | | 8/2008 | Mouton | |
| 2017/0341738 A1 | | 11/2017 | Grieser | |
| 2018/0001999 A1 | * | 1/2018 | Page | ....................... B64C 25/14 |

* cited by examiner

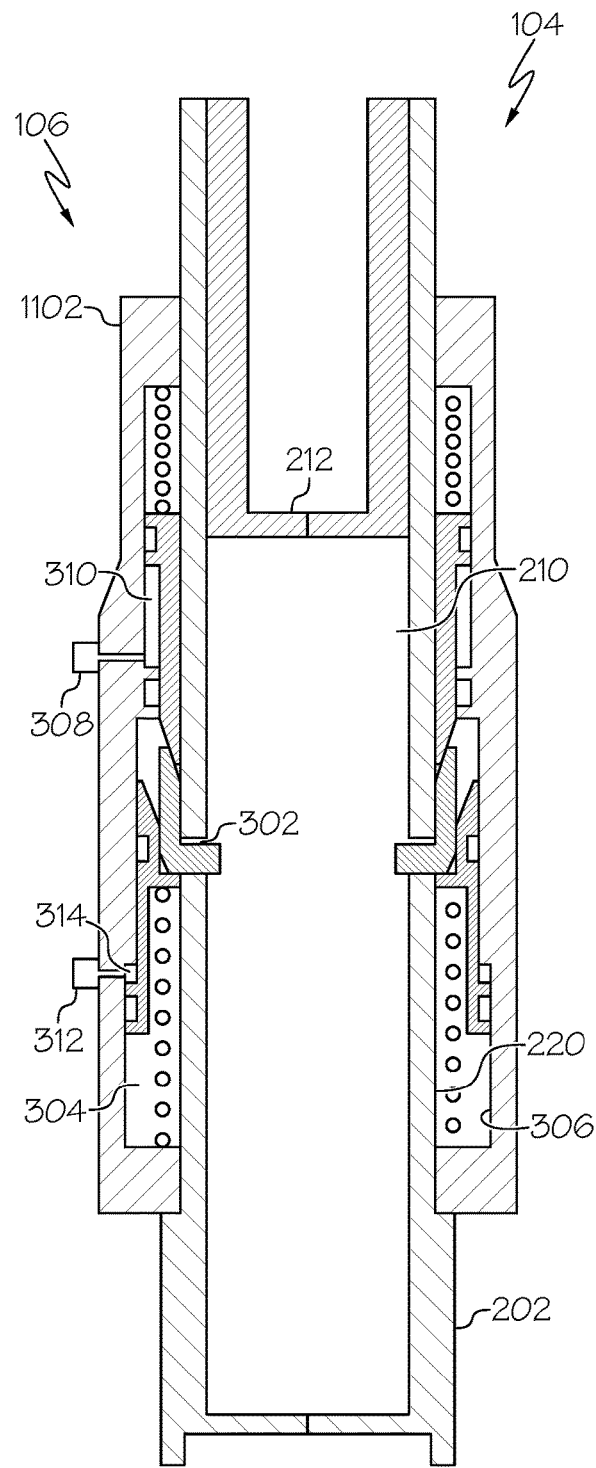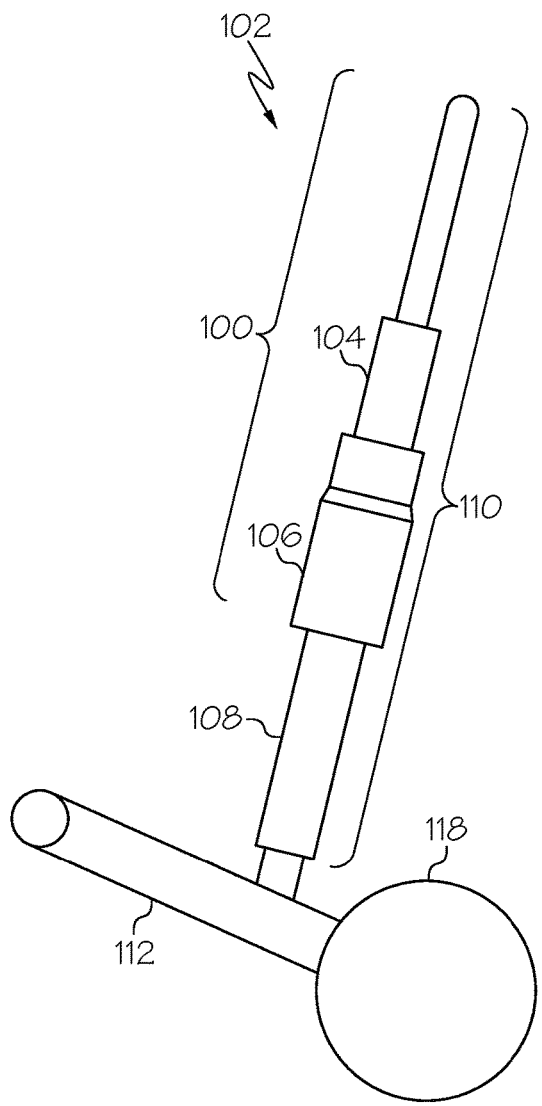
FIG. 3
FIG. 4

RETRACT ACTUATOR ASSEMBLIES, LANDING GEAR ASSEMBLIES AND METHODS FOR KNEELING LANDING GEAR ASSEMBLY OF AIRCRAFT

FIELD

The present disclosure relates generally to techniques for kneeling a landing gear assembly of an aircraft and, particularly, to using a retract actuator assembly that provides the landing gear assembly with a third position, between extended and retracted positions, that can be used to lower the aircraft to a kneeled state for certain ground operations.

BACKGROUND

Some aircraft feature landing gear with the capability to lower (i.e., kneel) the aircraft while the aircraft is on the ground. It is desirable to kneel the aircraft to ease crew and/or passenger ingress/egress, to facilitate cargo loading/unloading and to reduce aircraft height during transport and storage. Existing designs typically use some form of external kneeling mechanism to move the landing gear to a kneeled position. These concepts typically require an additional hydraulic actuator and additional mechanical linkages, which add cost, complexity and weight.

Accordingly, those skilled in the art continue with research and development efforts to improve techniques for kneeling a landing gear assembly of an aircraft.

SUMMARY

Disclosed are examples of retract actuator assemblies, landing gear assemblies and methods for kneeling a landing gear assembly of an aircraft. The following is a non-exhaustive list of examples, which may or may not be claimed, of the subject matter according to the present disclosure.

In an example, the disclosed retract actuator assembly for a landing gear assembly of an aircraft includes a retract actuator and a kneel stop assembly. The retract actuator includes an actuator housing and a piston. The actuator housing defines a longitudinal axis extending through a distal end and a proximal end. The actuator housing includes a cylinder bore along the longitudinal axis. The piston disposed within the cylinder bore and configured to move within the cylinder bore along the longitudinal axis. The cylinder bore defines a piston stroke within the actuator housing that defines limits for movement of the piston. The piston stroke includes an extended piston position relating to the distal end of the actuator housing and a retracted piston position relating to the proximal end of the actuator housing. The kneel stop assembly secured to an exterior surface of the actuator housing in relation to the extended piston position within the cylinder bore and the retracted piston position within the cylinder bore. The kneel stop assembly is configured to selectively establish a kneel stop position within the cylinder bore to reduce the piston stroke by inhibiting movement of the piston to the retracted piston position.

In an example, the disclosed landing gear assembly for an aircraft includes a retract actuator, a kneel stop assembly, a trailing arm and a shock absorber. The retract actuator includes an actuator housing and a piston. The actuator housing defines a longitudinal axis extending through a distal end and a proximal end. The actuator housing includes a cylinder bore along the longitudinal axis. The piston disposed within the cylinder bore and configured to move within the cylinder bore along the longitudinal axis. The cylinder bore defines a piston stroke within the actuator housing that defines limits for movement of the piston. The piston stroke includes an extended piston position relating to the distal end of the actuator housing and a retracted piston position relating to the proximal end of the actuator housing. The kneel stop assembly secured to an exterior surface of the actuator housing in relation to the extended piston position within the cylinder bore and the retracted piston position within the cylinder bore. The kneel stop assembly is configured to selectively establish a kneel stop position within the cylinder bore to reduce the piston stroke by inhibiting movement of the piston to the retracted piston position. The trailing arm includes an arm proximal end and an arm distal end. The arm distal end configured to pivotally attach to a fixed point on the aircraft. The arm proximal end configured to attach to a surface contact assembly. The shock absorber mechanically linked to the retract actuator and configured to pivotally attach to the trailing arm.

A method for kneeling a landing gear assembly of an aircraft is disclosed. In an example, the disclosed method includes: (1) performing ground operations for the aircraft in which the landing gear assembly is in a fully extended condition and a retract actuator of the landing gear assembly is in an extended piston position; (2) activating a kneeling feature of the landing gear assembly to establish a kneel stop position in the retract actuator that reduces a piston stroke for the retract actuator by inhibiting movement of a piston in the retract actuator beyond the kneel stop position toward a retracted piston position; and (3) moving the landing gear assembly from the fully extended condition to a kneeling condition by moving the retract actuator from the extended piston position to the kneel stop position.

Other examples of the disclosed retract actuator assemblies, landing gear assemblies and methods for kneeling a landing gear assembly of an aircraft will become apparent from the following detailed description, the accompanying drawings and the appended claims.

BRIEF DESCRIPTION OF THE DRAWINGS

FIG. 3 is a cross-sectional view of an example of a kneel stop assembly for the retract actuator assembly of FIG. 1 in which kneel stop segments are inserted into the retract actuator and the retract actuator is in an extended position;

FIG. 4 is a functional diagram showing the landing gear assembly of FIG. 1 in which the landing gear is in an extended condition and the aircraft weight is on the wheels;

DETAILED DESCRIPTION

The various examples of retract actuator assemblies, landing gear assemblies and methods for kneeling a landing gear assembly of an aircraft provide techniques that allow the retract actuator assembly to have a third position, between the extended and retracted positions, which can be used to lower the aircraft to a kneeled state while the aircraft is on the ground. This kneeled actuator position is provided using retractable stops, which when engaged limit the stroke of an actuator piston. These stops are inserted and withdrawn using a mechanism mounted in a housing on the outer diameter of the actuator. The mechanism includes a series of slider rings and springs. This mechanism requires external activation (e.g., hydraulic pressure) to change states (i.e., withdrawn-to-inserted or inserted-to-withdrawn), but once in either the withdrawn or inserted position the mechanism is self-locking.

The internal self-locking kneel mechanism provides many advantages over previous kneel methods. For example, the landing gear assembly does not require a secondary kneel actuator. Where an inline shock absorber/actuator is used, the mechanism does not reduce the length of the inline shock absorber/actuator and results in lower loads on the inline shock absorber/actuator. The mechanism has a limited hydraulic impact because low fluid volume is needed to kneel. The mechanism is implemented using a compact design that requires fewer structural interfaces. Moreover, the dedicated kneel mechanism is out of the landing load path which results in increased reliability and lower part weight.

Figure 1:
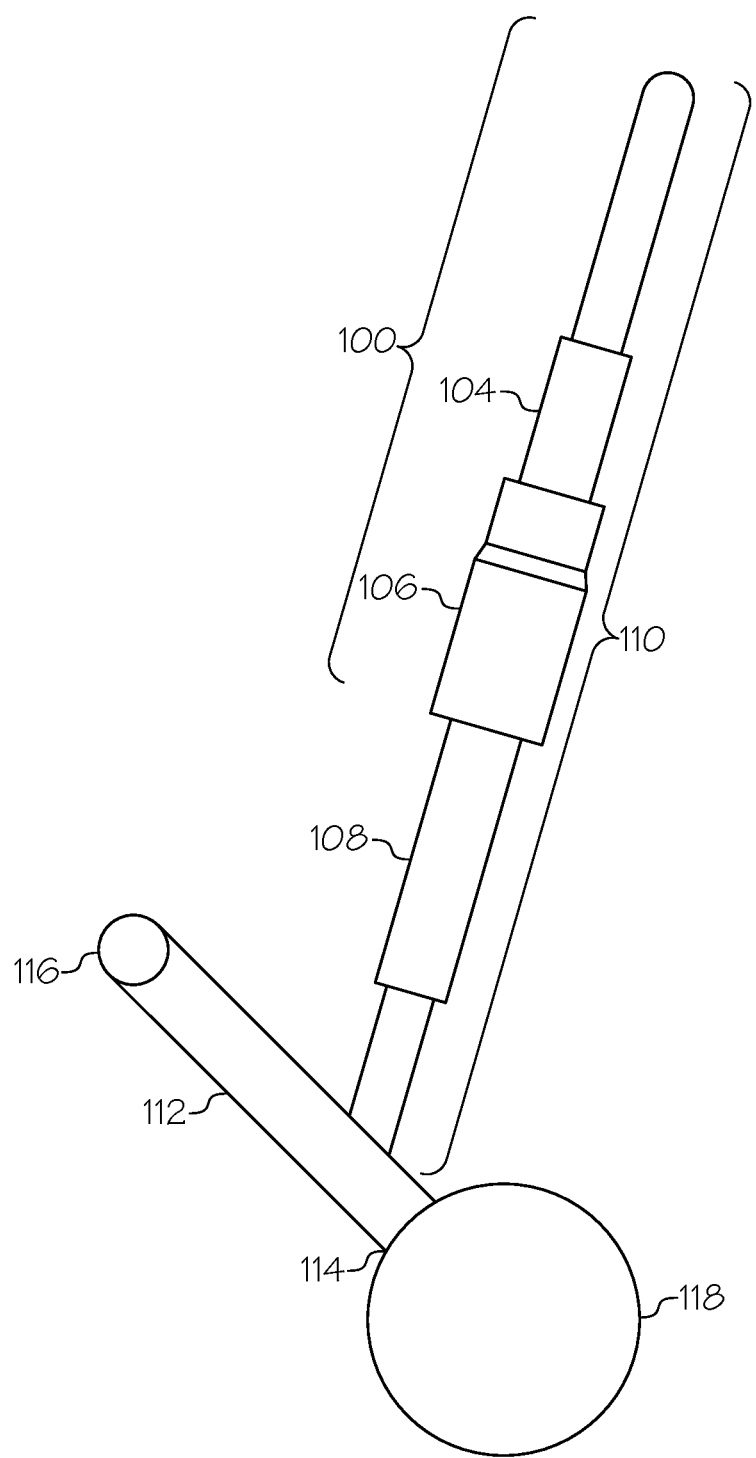
FIG. 1 is a functional diagram showing an example of a retract actuator assembly for an example of a landing gear assembly for an aircraft.
Figure 2:
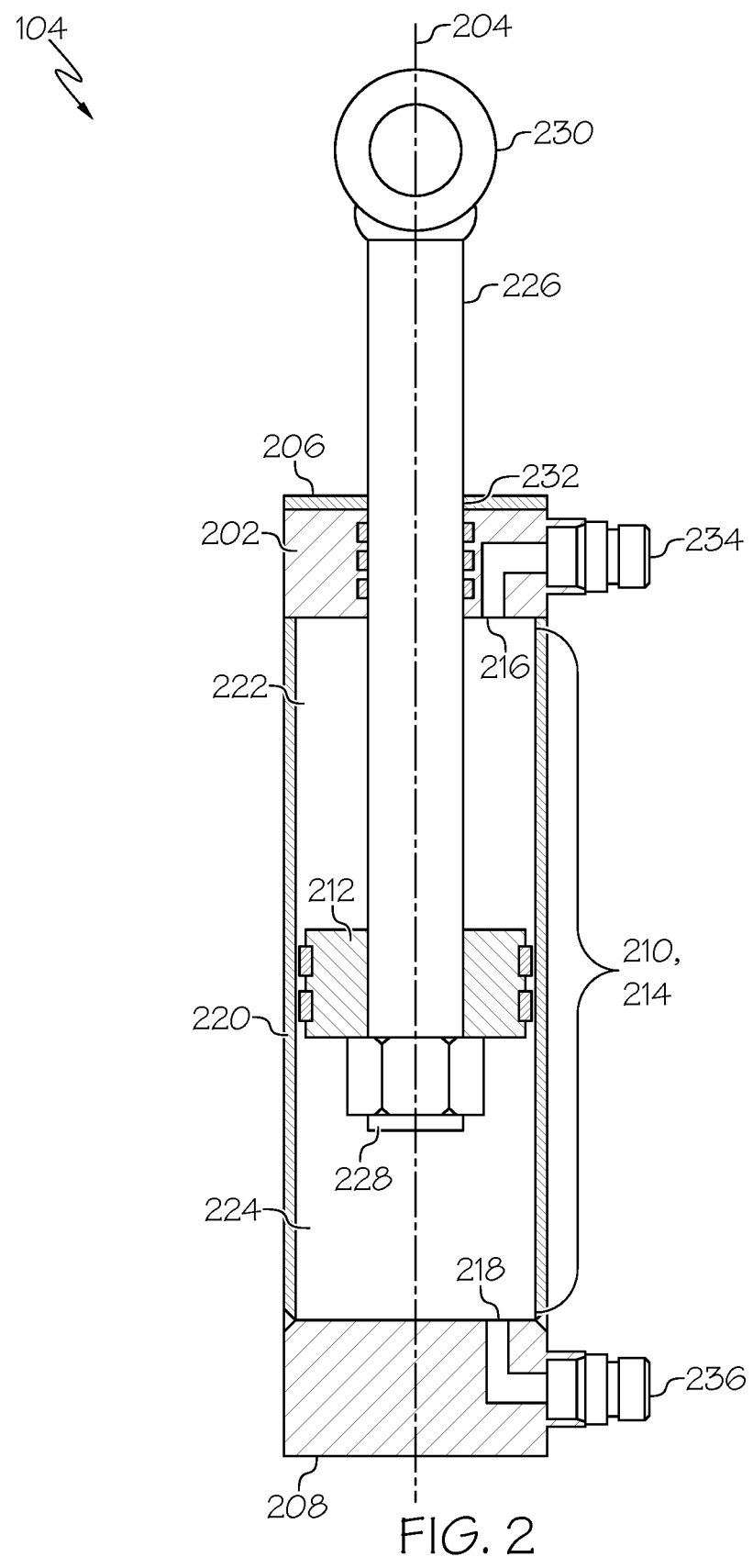
FIG. 2 is a cross-sectional view of an example of a retract actuator for the retract actuator assembly of FIG. 1.
Figure 5:
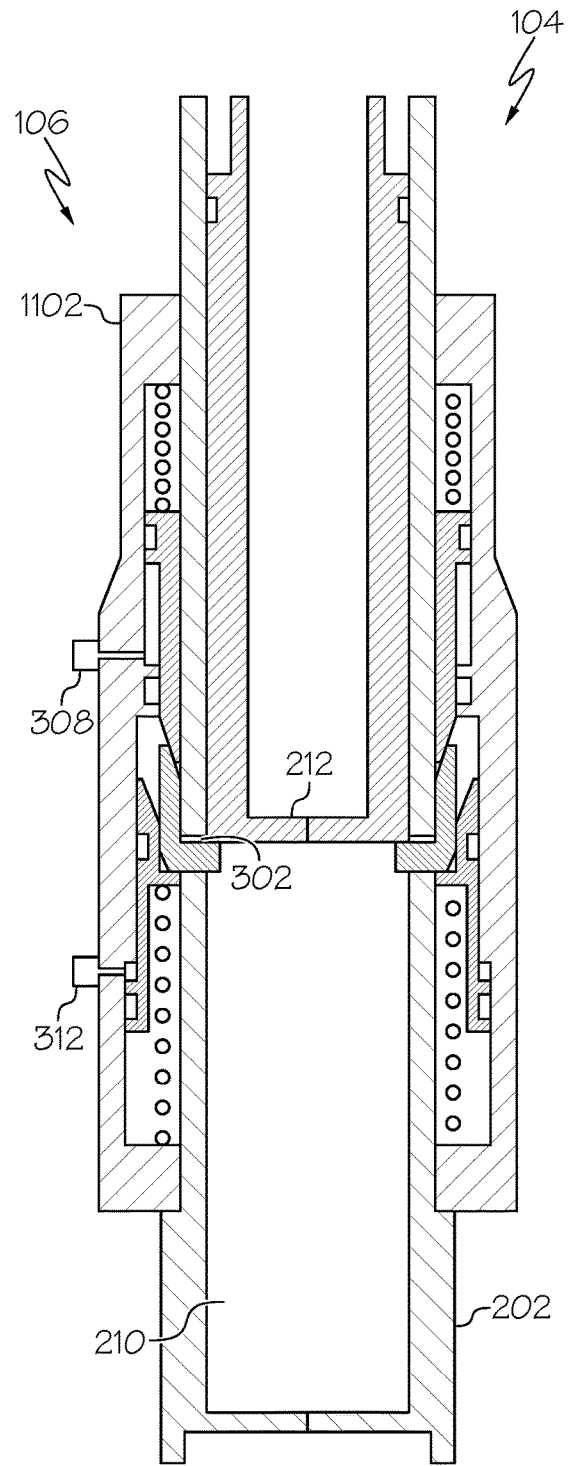
FIG. 5 is a cross-sectional view of an example of a kneel stop assembly for the retract actuator assembly of FIG. 1 in which kneel stop segments are inserted into the retract actuator and the retract actuator is in a kneeled position.

Referring generally to FIGS. 1-11, 12A-C and 24, by way of examples, the present disclosure is directed to a retract actuator assembly 100 for a landing gear assembly 102 of an aircraft 2400. FIG. 1 discloses an example of the retract actuator assembly 100. FIG. 2 shows a cross-sectional view of an example of a retract actuator 104 for the retract actuator assembly 100 of FIG. 1. FIG. 3 shows a cross-sectional view of an example of a kneel stop assembly 106 for the retract actuator assembly 100 of FIG. 1 in which kneel stop segments 1108 are inserted into the retract actuator 104 and the retract actuator 104 is in an extended position. FIG. 4 shows a functional diagram of the landing gear assembly 102 of FIG. 1 in which the landing gear assembly 102 is in an extended condition and the weight of the aircraft 2400 is on the wheels. FIG. 5 shows a cross-sectional view of an example of a kneel stop assembly 106 for the retract actuator assembly 100 of FIG. 1 in which the kneel stop segments 1108 are inserted into the retract actuator 104 and the retract actuator 104 is in a kneeled position.

Figure 6:
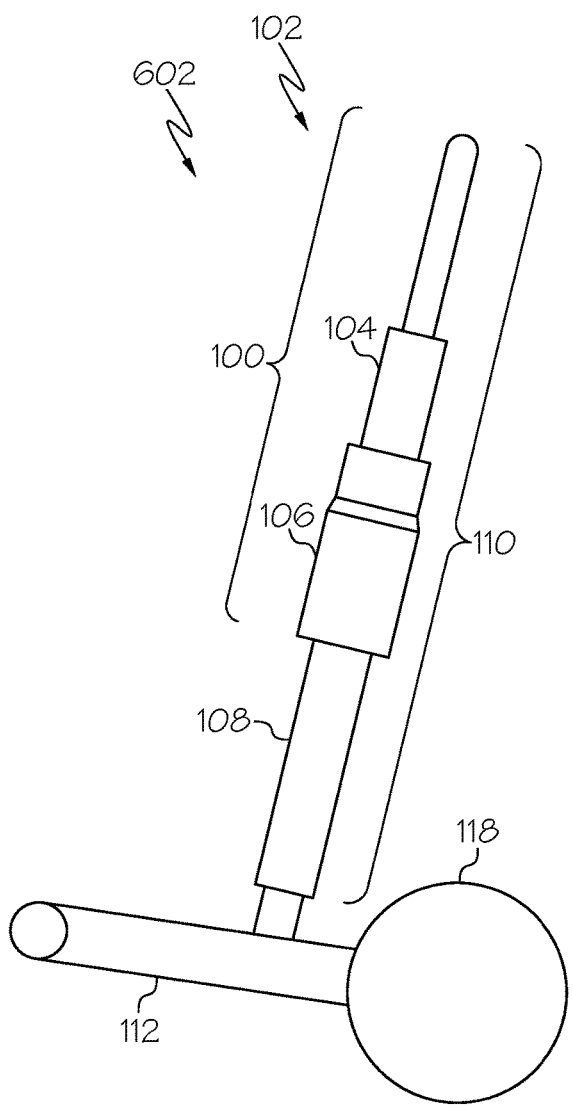
FIG. 6 is a functional diagram showing the landing gear assembly of FIG. 1 in which the landing gear is in a kneeled condition and the aircraft weight is on the wheels.
Figure 7:
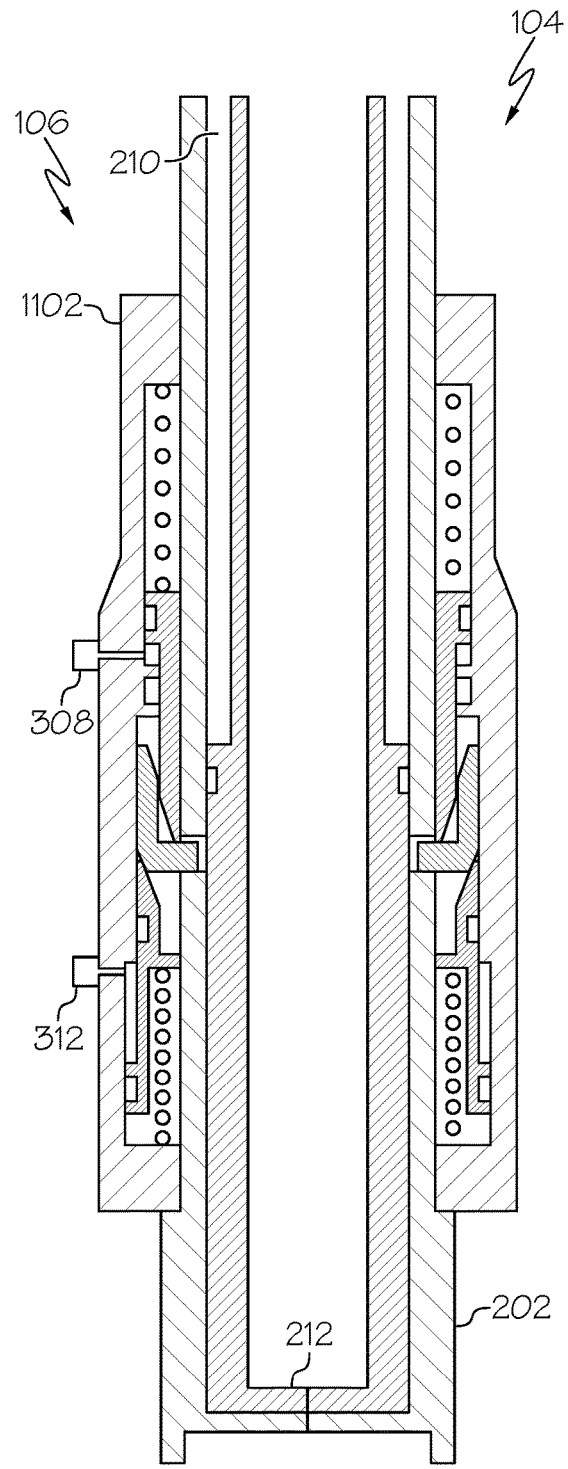
FIG. 7 is a cross-sectional view of an example of a kneel stop assembly for the retract actuator assembly of FIG. 1 in which kneel stop segments are withdrawn from the retract actuator and the retract actuator is in a retracted position.
Figure 8:
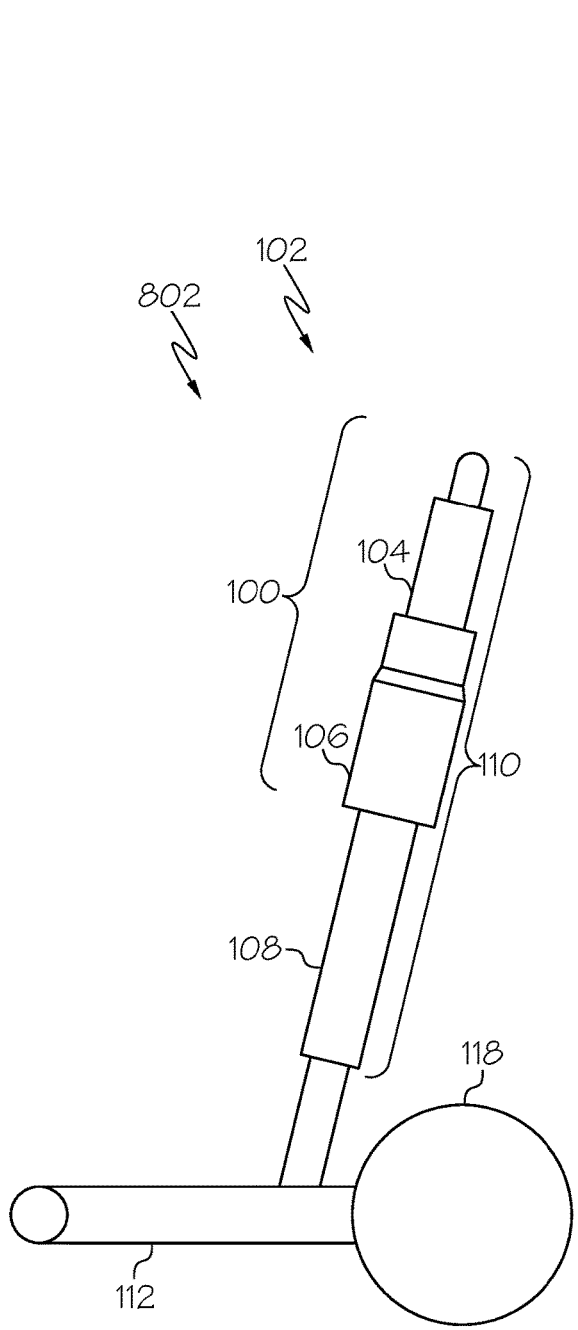
FIG. 8 is a functional diagram showing the landing gear assembly of FIG. 1 in which the landing gear is in a retracted condition and the aircraft is in flight.
Figure 9:
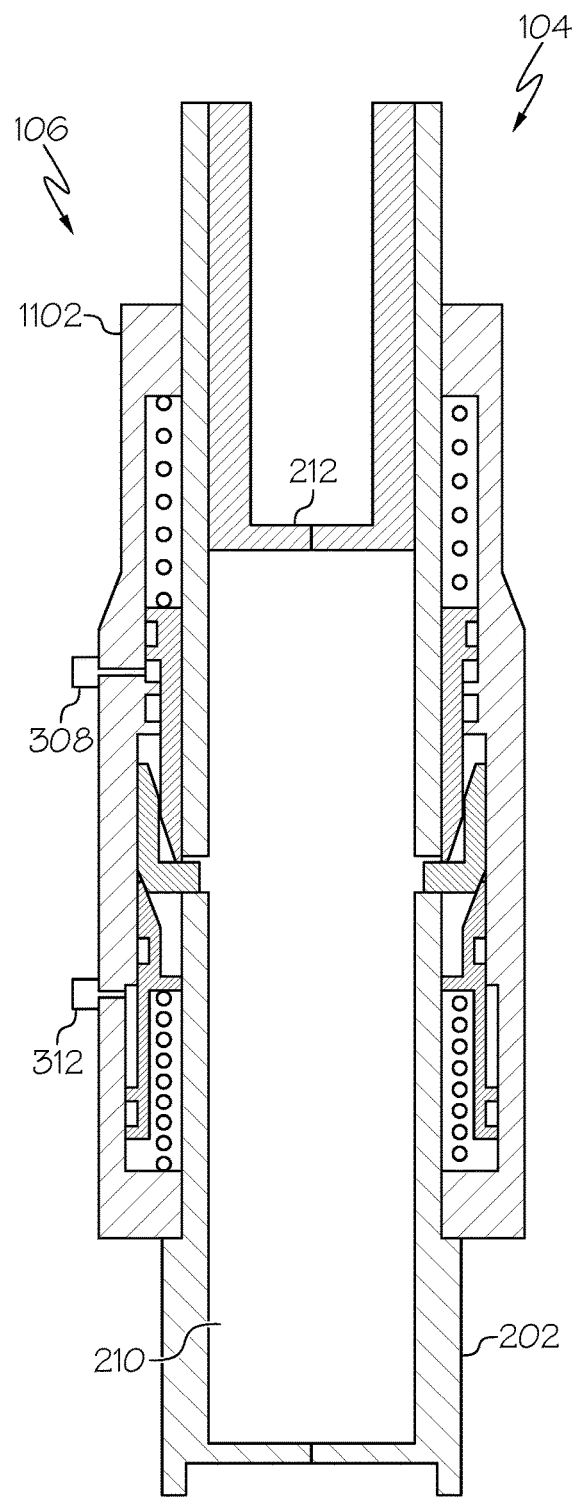
FIG. 9 is a cross-sectional view of an example of a kneel stop assembly for the retract actuator assembly of FIG. 1 in which kneel stop segments are withdrawn from the retract actuator and the retract actuator is in an extended position.
Figure 10:
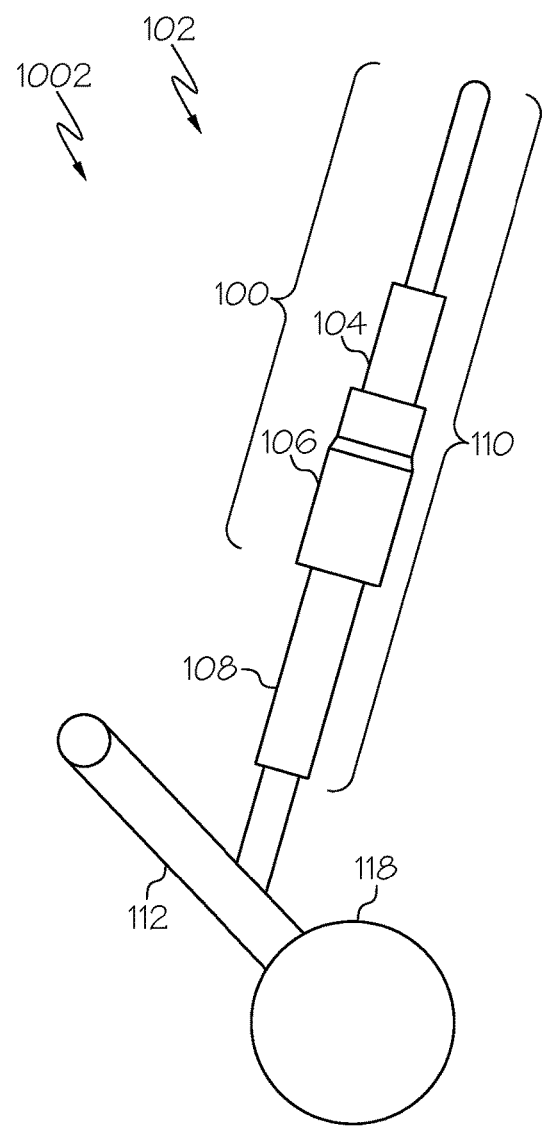
FIG. 10 is a functional diagram showing the landing gear assembly of FIG. 1 in which the landing gear is in an extended condition and the aircraft is in flight.
Figure 11:
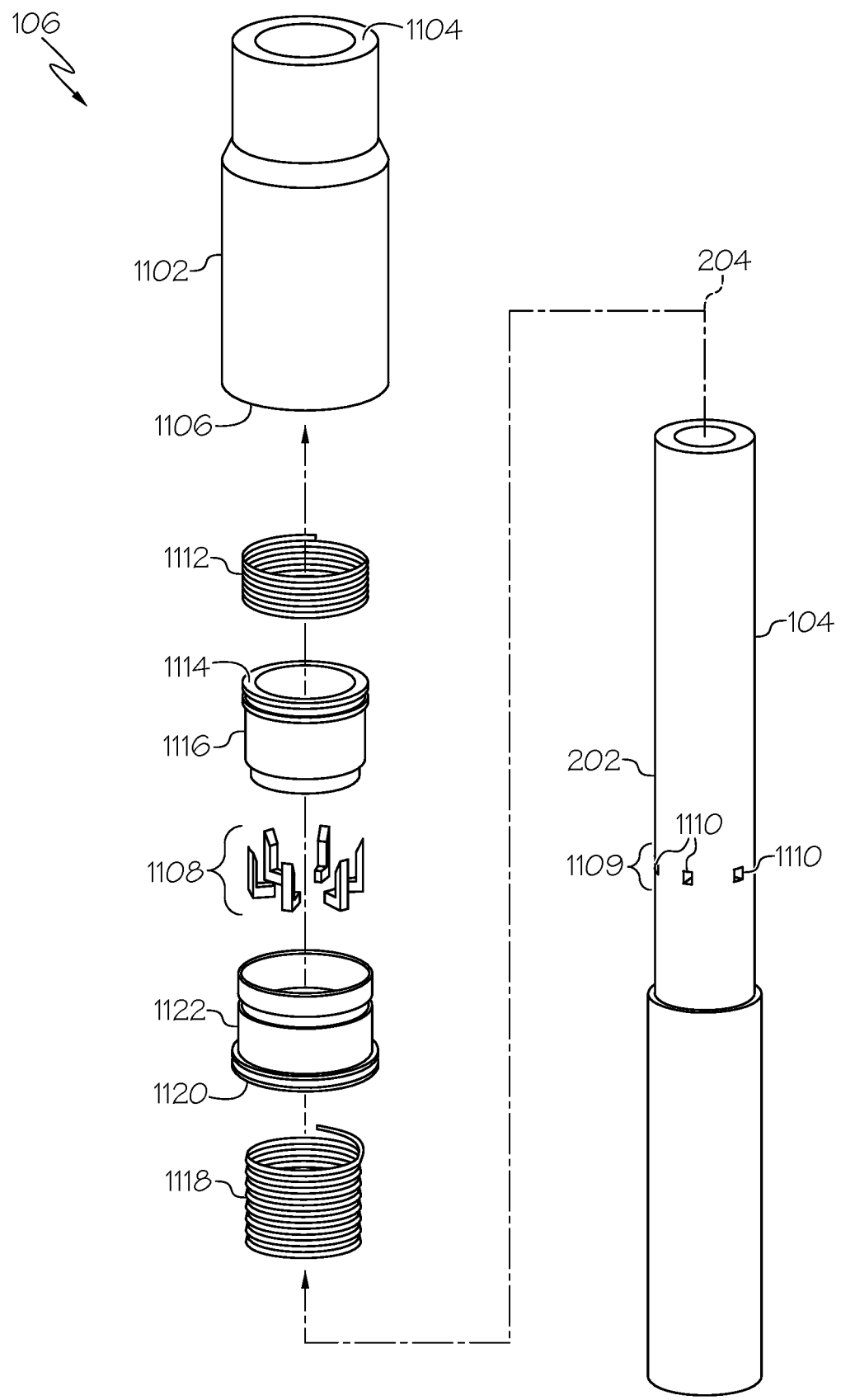
FIG. 11 is an exploded view of an example of the kneel stop assembly of FIG. 3 in relation to an example of a retract actuator for the retract actuator assembly of FIG. 1.

FIG. 6 shows a functional diagram of the landing gear assembly 102 of FIG. 1 in which the landing gear assembly 102 is in a kneeled condition and the weight of the aircraft 2400 is on the wheels. FIG. 7 shows a cross-sectional view of an example of a kneel stop assembly 106 for the retract actuator assembly 100 of FIG. 1 in which the kneel stop segments 1108 are withdrawn from the retract actuator 104 and the retract actuator 104 is in a retracted position. FIG. 8 shows a functional diagram of the landing gear assembly 102 of FIG. 1 in which the landing gear assembly 102 is in a retracted condition and the aircraft 2400 is in flight. FIG. 9 shows a cross-sectional view of an example of a kneel stop assembly 106 for the retract actuator assembly 100 of FIG. 1 in which the kneel stop segments 1108 are withdrawn from the retract actuator 104 and the retract actuator 104 is in an extended position. FIG. 10 shows a functional diagram of the landing gear assembly 102 of FIG. 1 in which the landing gear assembly 102 is in an extended condition and the aircraft 2400 is in flight. FIG. 11 provides an exploded view of an example of the kneel stop assembly 106 of FIG. 3 in relation to an example of a retract actuator 104 for the retract actuator assembly 100 of FIG. 1.

Figure 12C:
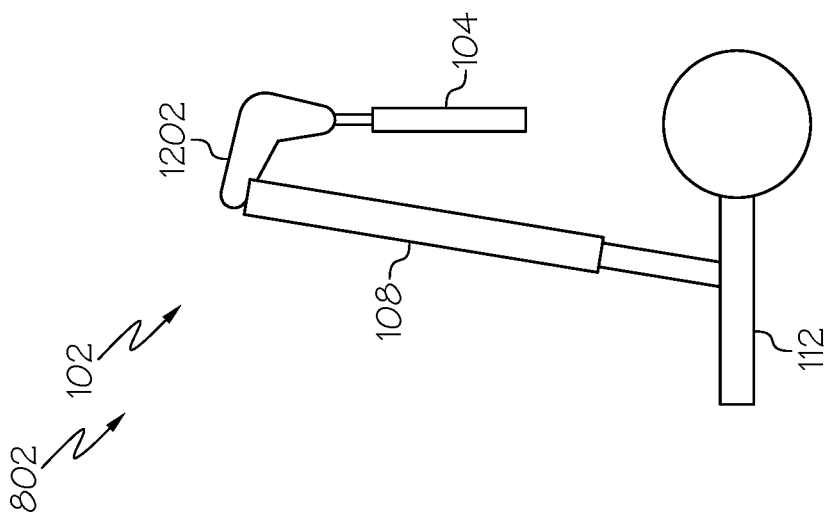
FIG. 12C is a functional diagram showing the landing gear assembly of FIG. 12A in which the landing gear is in a retracted condition and the aircraft is in flight.
Figure 12B:
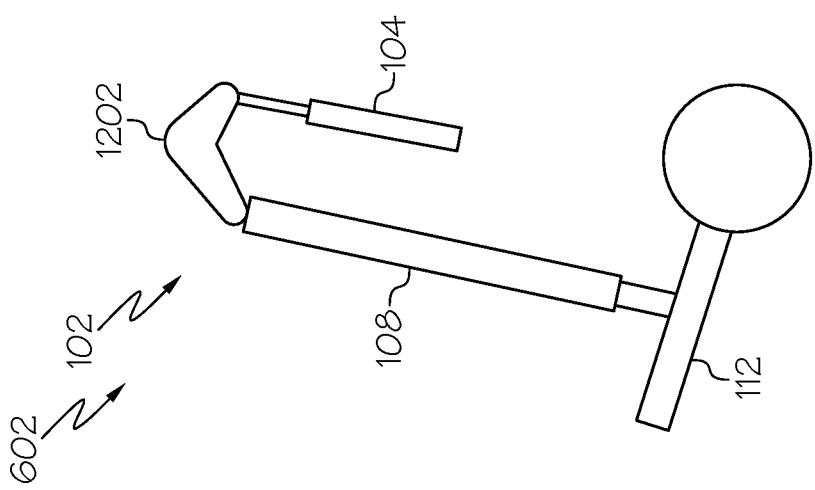
FIG. 12B is a functional diagram showing the landing gear assembly of FIG. 12A in which the landing gear is in a kneeled condition and the aircraft weight is on the wheels.
Figure 12A:
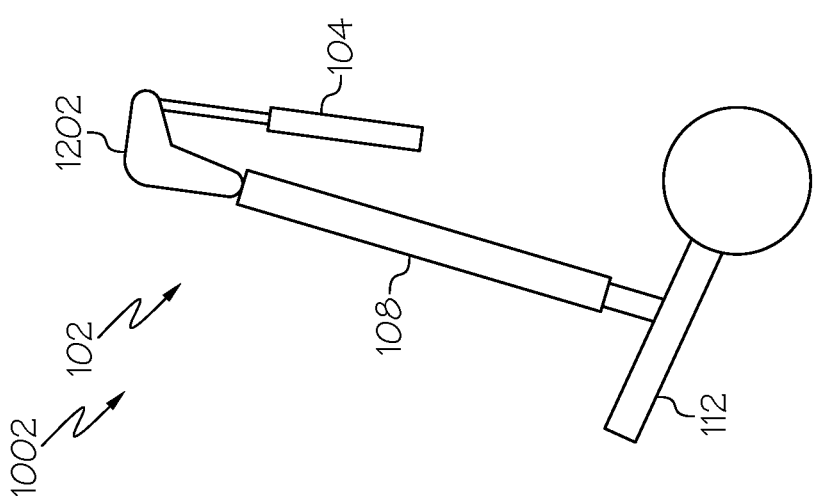
FIG. 12A is a functional diagram showing another example of a landing gear assembly in which the landing gear is in an extended condition and the aircraft weight is on the wheels.
Figure 24:
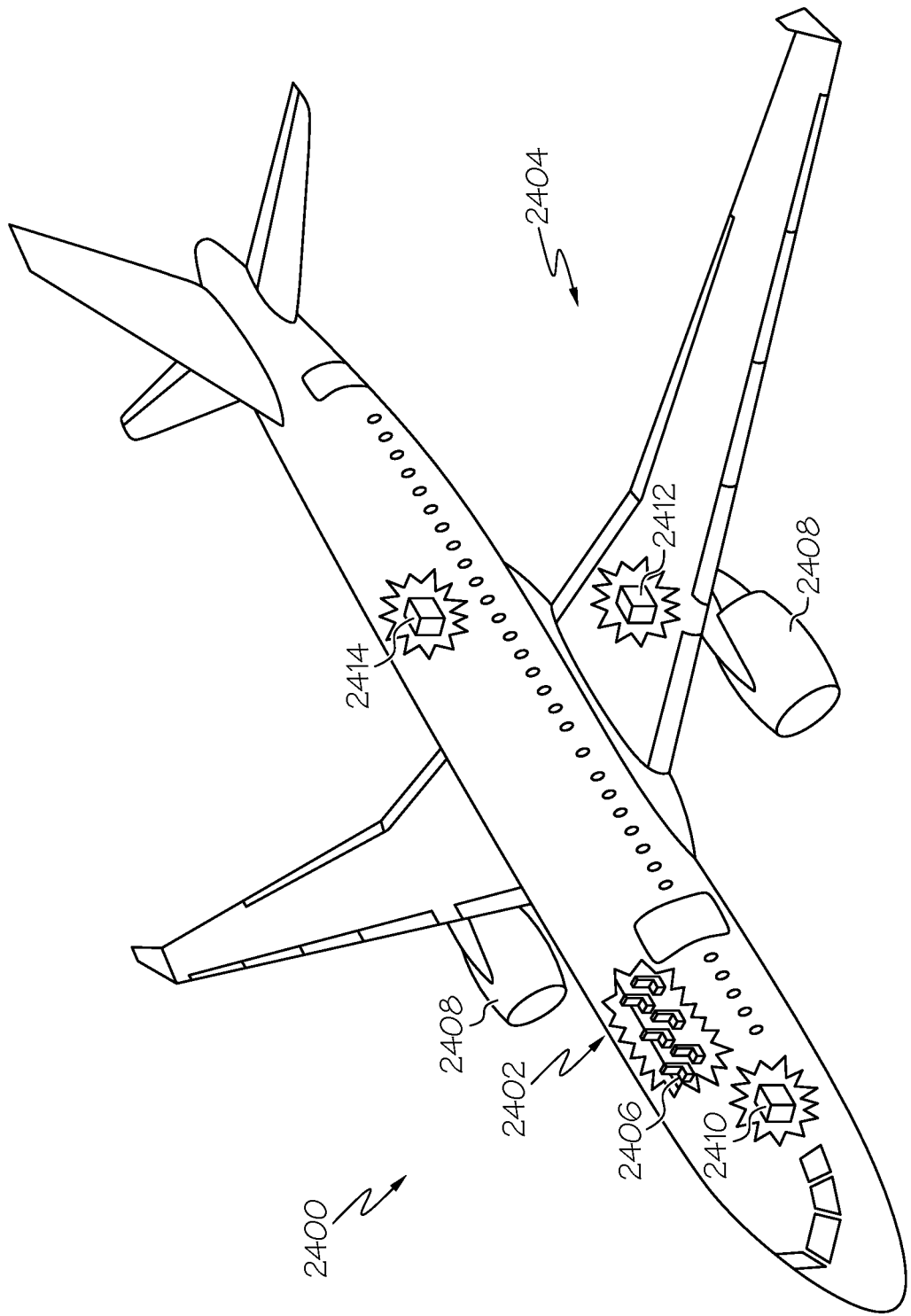
FIG. 24 is a schematic illustration of an aircraft that incorporates one or more examples of retract actuator assemblies and landing gear assemblies disclosed herein.

FIG. 12A discloses another example of a landing gear assembly 102 in which the landing gear assembly 102 is in an extended condition and the weight of the aircraft 2400 is on the wheels. FIG. 12B shows a functional diagram of the landing gear assembly 102 of FIG. 12A in which the landing gear assembly 102 is in a kneeled condition and the weight of the aircraft 2400 is on the wheels. FIG. 12C shows a functional diagram of the landing gear assembly 102 of FIG. 12A in which the landing gear assembly 102 is in a retracted condition and the aircraft 2400 is in flight. FIG. 24 shows an aircraft 2400 that incorporates one or more examples of retract actuator assemblies 100 disclosed herein.

With reference again to FIGS. 1-11, 12A-C and 24, in one or more examples, a retract actuator assembly 100 for a landing gear assembly 102 of an aircraft 2400 includes a retract actuator 104 and a kneel stop assembly 106. The retract actuator 104 includes an actuator housing 202 and a piston 212. The actuator housing 202 defines a longitudinal axis 204 extending through a distal end 206 and a proximal end 208. The actuator housing 202 includes a cylinder bore 210 along the longitudinal axis 204. The piston 212 disposed within the cylinder bore 210 and configured to move within the cylinder bore 210 along the longitudinal axis 204. The cylinder bore 210 defines a piston stroke 214 within the actuator housing 202 that defines limits for movement of the piston 212. The piston stroke 214 includes an extended piston position 216 relating to the distal end 206 of the actuator housing 202 and a retracted piston position 218 relating to the proximal end 208 of the actuator housing 202. The kneel stop assembly 106 secured to an exterior surface 220 of the actuator housing 202 in relation to the extended piston position 216 within the cylinder bore 210 and the retracted piston position 218 within the cylinder bore 210. The kneel stop assembly 106 configured to selectively establish a kneel stop position 302 within the cylinder bore 210 to reduce the piston stroke 214 by inhibiting movement of the piston 212 to the retracted piston position 218.

In another example, the retract actuator assembly 100 also includes a shock absorber 108 secured to the proximal end 208 of the actuator housing 202 such that the shock absorber 108 and retract actuator 104 are aligned along the longitudinal axis 204 of the actuator housing 202 to form an inline shock absorber actuator 110. The shock absorber 108 is configured to pivotally attach to a trailing arm 112 of the landing gear assembly 102.

In yet another example of the retract actuator assembly 100, the piston 212 defines a rod chamber 222 in the cylinder bore 210 relating to the distal end 206 of the actuator housing 202 and a piston chamber 224 in the cylinder bore 210 relating to the proximal end 208 of the actuator housing 202. In this example, the retract actuator 104 also includes a piston rod 226 disposed within the rod chamber 222. The piston rod 226 includes a first end 228 attached to the piston 212 and a second end 230 extending through a sealed aperture 232 at the distal end 206 of the actuator housing 202.

In a further example, the second end 230 of the piston rod 226 is configured to pivotally attach to a fixed point on the aircraft 2400. In this example, the retract actuator assembly 100 also includes a shock absorber 108 secured to the proximal end 208 of the actuator housing 202 such that the shock absorber 108 and retract actuator 104 are aligned along the longitudinal axis 204 of the actuator housing 202 to form an inline shock absorber actuator 110. The shock absorber 108 is configured to pivotally attach to a trailing arm 112 of the landing gear assembly 102. In an even further example, a mechanical linkage for the landing gear assembly 102 comprises a trailing arm 112 of the landing gear assembly 102 and the inline shock absorber actuator 110.

In another further example, the proximal end 208 of the actuator housing 202 is configured to pivotally attach to a fixed point on the aircraft 2400. In this example, the retract actuator assembly 100 also includes a shock absorber 108 mechanically linked to the second end 230 of the piston rod 226. The shock absorber 108 is configured to pivotally attach to a trailing arm 112 of the landing gear assembly 102. In an even further example, a mechanical linkage for the landing gear assembly 102 includes a trailing arm 112 of the landing gear assembly 102, the shock absorber 108, the retract actuator 104 and a linking member 1202 between the retract actuator 104 and the shock absorber 108.

In yet another further example of the retract actuator assembly 100, the retract actuator 104 also includes a rod hydraulic port 234 and a piston hydraulic port 236. The rod hydraulic port 234 disposed proximate the distal end 206 of the actuator housing 202 to provide fluidic access to the rod chamber 222. The piston hydraulic port 236 disposed proximate the proximal end 208 of the actuator housing 202 to provide fluidic access to the piston chamber 224.

In still another example of the retract actuator assembly 100, the extended piston position 216 of the piston stroke 214 within the cylinder bore 210 relates to a fully extended condition 1002 of the landing gear assembly 102 in conjunction with a landing sequence of the aircraft 2400. In still yet another example of the retract actuator assembly 100, the retracted piston position 218 of the piston stroke 214 within the cylinder bore 210 relates to a fully retracted condition 802 of the landing gear assembly 102 in conjunction with a takeoff sequence of the aircraft 2400. In another example of the retract actuator assembly 100, the kneel stop position 302 of the piston stroke 214 within the cylinder bore 210 relates to a kneeling condition 602 of the landing gear assembly 102 during ground operations of the aircraft 2400. In yet another example of the retract actuator assembly 100, the kneel stop assembly 106 is configured to permit the piston 212 to move from the kneel stop position 302 to the extended piston position 216 of the piston stroke 214 within the cylinder bore 210. In still another example of the retract actuator assembly 100, the kneel stop assembly 106 is configured to selectively remove the kneel stop position 302 of the piston stroke 214 within the cylinder bore 210 to permit movement of the piston 212 to the retracted piston position 218 of the piston stroke 214.

In still yet another example of the retract actuator assembly 100, the kneel stop assembly 106 includes a kneel stop housing 1102, a kneel stop insert port 308 and a kneel stop withdraw port 312. The a kneel stop housing 1102 secured to the exterior surface 220 of the actuator housing 202 of the retract actuator 104 in relation to the extended piston position 216 within the cylinder bore 210 of the retract actuator 104 and the retracted piston position 218 within the cylinder bore 210. The kneel stop housing 1102 includes a kneel stop distal end 1104 closer to the distal end 206 of the actuator housing 202 and a kneel stop proximal end 1106 closer to the proximal end 208 of the actuator housing 202. The kneel stop housing 1102 defines a cavity 304 between an interior surface 306 of the kneel stop housing 1102 and the exterior surface 220 of the actuator housing 202. The kneel stop insert port 308 disposed on the kneel stop housing 1102 to provide fluidic access to a kneel stop insert chamber 310 formed within the cavity 304. The kneel stop withdraw port 312 disposed on the kneel stop housing 1102 to provide fluidic access to a kneel stop withdraw chamber 314 formed within the cavity 304.

In a further example, the kneel stop insert port 308 is configured to receive a pressurized fluid from a pressurized fluid source and the kneel stop assembly 106 is configured to establish the kneel stop position 302 in response to receipt of the pressurized fluid at the kneel stop insert port 308. In an even further example, the pressurized fluid includes a pressurized hydraulic fluid, a pressurized oil, a compressed gas, a compressed air or any other suitable pressurized fluid in any suitable combination. In another even further example, the kneel stop insert port 308 is configured to permit the pressurized fluid to exit the kneel stop assembly 106 after the pressurized fluid is no longer applied by the pressurized fluid source. In this example, the kneel stop assembly 106 is configured such that exiting of the pressurized fluid via the kneel stop insert port 308 does not impact a current state of the kneel stop position 302.

In another further example, the kneel stop withdraw port 312 is configured to receive a pressurized fluid from a pressurized fluid source. In this example, the kneel stop assembly 106 is configured to remove the kneel stop position 302 in response to receipt of the pressurized fluid at the kneel stop withdraw port 312. In an even further example, the kneel stop withdraw port 312 is configured to permit the pressurized fluid to exit the kneel stop assembly 106. In this example, the kneel stop assembly 106 is configured such that exiting of the pressurized fluid via the kneel withdraw port 312 does not impact a current state of the kneel stop position 302.

In yet another further example of the retract actuator assembly 100, the kneel stop assembly 106 also includes at least one kneel stop segment 1108 disposed within the cavity 304 of the kneel stop housing 1102 at a predetermined point 1109 along the longitudinal axis 204 of the actuator housing 202. The predetermined point 1109 associated with the kneel stop position 302. In this example, the actuator housing 202 includes at least one kneel stop aperture 1110 extending through the actuator housing 202 to the cylinder bore 210. The at least one kneel stop aperture 1110 configured to receive at least a portion of the at least one kneel stop segment 1108. The at least one kneel stop segment 1108 configured for selective insertion into the at least one kneel stop aperture 1110 and configured for selective removal from the at least one kneel stop aperture 1110. In an even further example, the at least one kneel stop segment 1108 includes at least two kneel stop segments 1108 radially dispersed around the actuator housing 202 at the predetermined point 1109. In this example, the at least one kneel stop aperture 1110 comprises at least two kneel stop apertures 1110 radially dispersed around the actuator housing 202 in relation to the at least two kneel stop segments 1108.

In another even further example, the at least one kneel stop segment 1108 of the kneel stop assembly 106 includes two kneel stop segments, three kneel stop segments, four kneel stop segments, five kneel stop segments, six kneel stop segments or any other suitable quantity of kneel stop segments. Correspondingly, the at least one kneel stop aperture 1110 of the retract actuator 104 includes two kneel stop apertures, three kneel stop apertures, four kneel stop apertures, five kneel stop apertures, six kneel stop apertures or any other suitable quantity of kneel stop apertures. In yet another even further example, the kneel stop insert port 308 is configured to receive a pressurized fluid from a pressurized fluid source and the kneel stop assembly 106 is configured to insert the at least one kneel stop segment 1108 into the at least one kneel stop aperture 1110 of the actuator housing 202 to establish the kneel stop position 302 in response to receipt of the pressurized fluid at the kneel stop insert port 308. In still yet another even further example, the kneel stop withdraw port 312 is configured to receive a pressurized fluid from a pressurized fluid source and the kneel stop assembly 106 is configured to withdraw the at least one kneel stop segment 1108 from the at least one kneel stop aperture 1110 of the actuator housing 202 to remove the kneel stop position 302 in response to receipt of the pressurized fluid at the kneel stop withdraw port 312.

With continued reference to FIGS. 1-3 and 11, in one or more additional examples of the retract actuator assembly 100, the kneel stop assembly 106 also includes an upper biasing member 1112, an upper slider member 1114, a lower biasing member 1118 and a lower slider member 1120. The an upper biasing member 1112 disposed within the cavity 304 between the kneel stop housing 1102 and the actuator housing 202 and proximate the kneel stop distal end 1104 of the kneel stop housing 1102. The upper slider member 1114 disposed within the cavity 304 between the kneel stop housing 1102 and the actuator housing 202 and between the upper biasing member 1112 and the at least one kneel stop segment 1108. The upper slider member 1114 includes a first portion of an upper slider exterior surface 1116 facing the interior surface 306 of the kneel stop housing 1102. The first portion of the upper slider exterior surface 1116 and an opposing portion of the interior surface 306 for the kneel stop housing 1102 are configured to form the kneel stop insert chamber 310. The upper biasing member 1112 configured to bias the upper slider member 1114 toward the at least one kneel stop segment 1108. The lower biasing member 1118 disposed within the cavity 304 between the kneel stop housing 1102 and the actuator housing 202 and proximate the kneel stop proximal end 1106 of the kneel stop housing 1102. The lower slider member 1120 disposed within the cavity 304 between the kneel stop housing 1102 and the actuator housing 202 and between the at least one kneel stop segment 1108 and the lower biasing member 1118. The lower slider member 1120 includes a first portion of a lower slider exterior surface 1122 facing the interior surface 306 of the kneel stop housing 1102. The first portion of the lower slider exterior surface 1122 and an opposing portion of the interior surface 306 for the kneel stop housing 1102 are configured to form the kneel stop withdraw chamber 314. The lower biasing member 1118 configured to bias the lower slider member 1120 toward the at least one kneel stop segment 1108.

In another example of the retract actuator assembly 100, the upper slider member 1114 of the kneel stop assembly 106 also includes a second portion of the upper slider exterior surface 1116 in opposing geometric relation with an upper surface of the at least one kneel stop segment 1108 and a third portion of the upper slider exterior surface 1116 adjacent to a corresponding portion of the exterior surface 220 of the actuator housing 202. The second portion of the upper slider exterior surface 1116 rises at a predetermined angle from the third portion of the upper slider exterior surface 1116 to the first portion of the upper slider exterior surface 1116 to facilitate withdrawing the at least one kneel stop segment 1108 from the at least one kneel stop aperture 1110 of the actuator housing 202. The first portion of the upper slider exterior surface 1116 and the third portion of the upper slider exterior surface 1116 are configured to slide between the at least one kneel stop segment 1108 and the exterior surface 220 of the actuator housing 202 in response to application of pressure at the kneel stop withdraw port 312 to block the at least one kneel stop segment 1108 from being inserted into the at least one kneel stop aperture 1110.

In yet another example of the retract actuator assembly 100, the lower slider member 1120 of the kneel stop assembly 106 also includes a second portion of the lower slider exterior surface 1122 in opposing geometric relation with a lower surface of the at least one kneel stop segment 1108 and a third portion of the lower slider exterior surface 1122 adjacent to a corresponding portion of the interior surface 306 of the kneel stop housing 1102. The second portion of the lower slider exterior surface 1122 falls at a predetermined angle from the first portion of the lower slider exterior surface 1122 to the third portion of the lower slider exterior surface 1122 to facilitate inserting the at least one kneel stop segment 1108 into the at least one kneel stop aperture 1110 of the actuator housing 202. The first portion of the lower slider exterior surface 1122 and the third portion of the lower slider exterior surface 1122 are configured to slide between the at least one kneel stop segment 1108 and the interior surface 306 of the kneel stop housing 1102 in response to application of pressure at the kneel stop insert port 308 to block the at least one kneel stop segment 1108 from being withdrawn from the at least one kneel stop aperture 1110.

In still another example of the retract actuator assembly 100, the kneel stop insert port 308 is configured to receive a pressurized fluid from a pressurized fluid source and to provide the pressurized fluid to the kneel stop insert chamber 310. The kneel stop assembly 106 is configured to move the upper slider member 1114 toward the upper biasing member 1112 and away from the at least one kneel stop segment 1108 in response to receipt of the pressurized fluid by the kneel stop insert chamber 310. The kneel stop assembly 106 is configured to move the lower slider member 1120 toward the at least one kneel stop segment 1108 in response to the upper slider member 1114 moving away from the at least one kneel stop segment 1108 and the lower biasing member 1118 biasing the lower slider member 1120 toward the at least one kneel stop segment 1108. The kneel stop assembly 106 is configured to insert the at least one kneel stop segment 1108 into the at least one kneel stop aperture 1110 of the actuator housing 202 in response to the lower slider member 1120 moving toward the at least one kneel stop segment 1108 and pushing the at least one kneel stop segment 1108 into the at least one kneel stop aperture 1110 to establish the kneel stop position 302 within the cylinder bore 210 of the retract actuator 104. In a further example of the retract actuator assembly 100, after the at least one kneel stop segment 1108 of the kneel stop assembly 106 is inserted into the at least one kneel stop aperture 1110 of the actuator housing 202, the lower biasing member 1118, the lower slider member 1120 and the at least one kneel stop segment 1108 are configured such that the lower slider member 1120 is moved into a locking position that maintains the at least one kneel stop segment 1108 inserted into the at least one kneel stop aperture 1110 with or without pressure applied to the kneel stop insert port 308 until pressure is applied to the kneel stop withdraw port 312.

In still yet another example of the retract actuator assembly 100, the kneel stop withdraw port 312 is configured to receive a pressurized fluid from a pressurized fluid source and to provide the pressurized fluid to the kneel stop withdraw chamber 314. The kneel stop assembly 106 is configured to move the lower slider member 1120 toward the lower biasing member 1118 and away from the at least one kneel stop segment 1108 in response to receipt of the pressurized fluid by the kneel stop withdraw chamber 314. The kneel stop assembly 106 is configured to move the upper slider member 1114 toward the at least one kneel stop segment 1108 in response to the lower slider member 1120 moving away from the at least one kneel stop segment 1108 and the upper biasing member 1112 biasing the upper slider member 1114 toward the at least one kneel stop segment 1108. The kneel stop assembly 106 is configured to withdraw the at least one kneel stop segment 1108 from the at least one kneel stop aperture 1110 of the actuator housing 202 in response to the upper slider member 1114 moving toward the at least one kneel stop segment 1108 and pushing the at least one kneel stop segment 1108 away from the at least one kneel stop aperture 1110 to remove the kneel stop position 302 from the cylinder bore 210 of the retract actuator 104. In a further example of the retract actuator assembly 100, after the at least one kneel stop segment 1108 of the kneel stop assembly 106 is withdrawn from the at least one kneel stop aperture 1110 of the actuator housing 202. The upper biasing member 1112, the upper slider member 1114 and the at least one kneel stop segment 1108 are configured such that the upper slider member 1114 is moved into a locking position that maintains the at least one kneel stop segment 1108 withdrawn from the at least one kneel stop aperture 1110 with or without pressure applied to the kneel stop withdraw port 312 until pressure is applied to the kneel stop insert port 308.

Referring generally to FIGS. 1-11, 12A-C and 24, by way of examples, the present disclosure is directed to a landing gear assembly 102 for a landing gear assembly 102 of an aircraft 2400. FIG. 1 discloses an example of the landing gear assembly 102 with a retract actuator assembly 100. FIG. 2 shows a cross-sectional view of an example of a retract actuator 104 for the retract actuator assembly 100 of FIG. 1. FIG. 3 shows a cross-sectional view of an example of a kneel stop assembly 106 for the landing gear assembly 102 of FIG. 1 in which kneel stop segments 1108 are inserted into the retract actuator 104 and the retract actuator 104 is in an extended position. FIG. 4 shows a functional diagram of the landing gear assembly 102 of FIG. 1 in which the landing gear assembly 102 is in an extended condition and the weight of the aircraft 2400 is on the wheels. FIG. 5 shows a cross-sectional view of an example of a kneel stop assembly 106 for the landing gear assembly 102 of FIG. 1 in which the kneel stop segments 1108 are inserted into the retract actuator 104 and the retract actuator 104 is in a kneeled position.

FIG. 6 shows a functional diagram of the landing gear assembly 102 of FIG. 1 in which the landing gear assembly 102 is in a kneeled condition and the weight of the aircraft 2400 is on the wheels. FIG. 7 shows a cross-sectional view of an example of a kneel stop assembly 106 for the landing gear assembly 102 of FIG. 1 in which the kneel stop segments 1108 are withdrawn from the retract actuator 104 and the retract actuator 104 is in a retracted position. FIG. 8 shows a functional diagram of the landing gear assembly 102 of FIG. 1 in which the landing gear assembly 102 is in a retracted condition and the aircraft 2400 is in flight. FIG. 9 shows a cross-sectional view of an example of a kneel stop assembly 106 for the landing gear assembly 102 of FIG. 1 in which the kneel stop segments 1108 are withdrawn from the retract actuator 104 and the retract actuator 104 is in an extended position. FIG. 10 shows a functional diagram of the landing gear assembly 102 of FIG. 1 in which the landing gear assembly 102 is in an extended condition and the aircraft 2400 is in flight. FIG. 11 provides an exploded view of an example of the kneel stop assembly 106 of FIG. 3 in relation to an example of a retract actuator 104 for the retract actuator assembly 100 of FIG. 1.

FIG. 12A discloses another example of a landing gear assembly 102 in which the landing gear assembly 102 is in an extended condition and the weight of the aircraft 2400 is on the wheels. FIG. 12B shows a functional diagram of the landing gear assembly 102 of FIG. 12A in which the landing gear assembly 102 is in a kneeled condition and the weight of the aircraft 2400 is on the wheels. FIG. 12C shows a functional diagram of the landing gear assembly 102 of FIG. 12A in which the landing gear assembly 102 is in a retracted condition and the aircraft 2400 is in flight. FIG. 24 shows an aircraft 2400 that incorporates one or more examples of landing gear assemblies 102 disclosed herein.

With reference again to FIGS. 1-11, 12A-C and 24, in one or more examples, a landing gear assembly 102 for an aircraft 2400 includes a retract actuator 104, a kneel stop assembly 106, a trailing arm 112 and a shock absorber 108. The retract actuator 104 includes an actuator housing 202 and a piston 212. The actuator housing 202 defines a longitudinal axis 204 extending through a distal end 206 and a proximal end 208. The actuator housing 202 includes a cylinder bore 210 along the longitudinal axis 204. The piston 212 disposed within the cylinder bore 210. The piston configured to move within the cylinder bore 210 along the longitudinal axis 204. The cylinder bore 210 defines a piston stroke 214 within the actuator housing 202 that defines limits for movement of the piston 212. The piston stroke 214 includes an extended piston position 216 relating to the distal end 206 of the actuator housing 202 and a retracted piston position 218 relating to the proximal end 208 of the actuator housing 202. The kneel stop assembly 106 secured to an exterior surface 220 of the actuator housing 202 in relation to the extended piston position 216 within the cylinder bore 210 and the retracted piston position 218 within the cylinder bore 210. The kneel stop assembly 106 configured to selectively establish a kneel stop position 302 within the cylinder bore 210 to reduce the piston stroke 214 by inhibiting movement of the piston 212 to the retracted piston position 218. The trailing arm 112 includes an arm proximal end 114 and an arm distal end 116, the arm distal end 116 configured to pivotally attach to a fixed point on the aircraft 2400. The arm proximal end 114 configured to attach to a surface contact assembly 118. The shock absorber 108 mechanically linked to the retract actuator 104 and configured to pivotally attach to the trailing arm 112.

In another example of the landing gear assembly 102, the shock absorber 108 is secured to the proximal end 208 of the actuator housing 202 such that the shock absorber 108 and retract actuator 104 are aligned along the longitudinal axis 204 of the actuator housing 202 to form an inline shock absorber actuator 110.

In yet another example of the landing gear assembly 102, the piston 212 defines a rod chamber 222 in the cylinder bore 210 relating to the distal end 206 of the actuator housing 202 and a piston chamber 224 in the cylinder bore 210 relating to the proximal end 208 of the actuator housing 202. In this example, the retract actuator 104 also includes a piston rod 226 disposed within the rod chamber 222. The piston rod 226 includes a first end 228 attached to the piston 212 and a second end 230 extending through a sealed aperture 232 at the distal end 206 of the actuator housing 202.

In a further example, the second end 230 of the piston rod 226 is configured to pivotally attach to a second fixed point on the aircraft 2400. In this example, the shock absorber 108 is secured to the proximal end 208 of the actuator housing 202 such that the shock absorber 108 and retract actuator 104 are aligned along the longitudinal axis 204 of the actuator housing 202 to form an inline shock absorber actuator 110. In an even further example, a mechanical linkage for the landing gear assembly 102 includes the trailing arm 112 and the inline shock absorber actuator 110.

In another further example, the second end 230 of the piston rod 226 in the retract actuator 104 is mechanically linked to the shock absorber 108 and the proximal end 208 of the actuator housing 202 is configured to pivotally attach to a second fixed point on the aircraft 2400. In an even further example, a mechanical linkage for the landing gear assembly 102 includes the trailing arm 112, the shock absorber 108, the retract actuator 104 and a linking member 1202 between the retract actuator 104 and the shock absorber 108.

In yet another further example of the landing gear assembly 102, the retract actuator 104 also includes a rod hydraulic port 234 and a piston hydraulic port 236. The rod hydraulic port 234 disposed proximate the distal end 206 of the actuator housing 202 to provide fluidic access to the rod chamber 222. The piston hydraulic port 236 disposed proximate the proximal end 208 of the actuator housing 202 to provide fluidic access to the piston chamber 224.

In still another example of the landing gear assembly 102, the surface contact assembly 118 includes a wheel, a ski or any other suitable surface contact assembly. In still yet another example of the landing gear assembly 102, the extended piston position 216 of the piston stroke 214 within the cylinder bore 210 relates to a fully extended condition 1002 of the landing gear assembly 102 in conjunction with a landing sequence of the aircraft 2400. In another example of the landing gear assembly 102, the retracted piston position 218 of the piston stroke 214 within the cylinder bore 210 relates to a fully retracted condition 802 of the landing gear assembly 102 in conjunction with a takeoff sequence of the aircraft 2400. In yet another example of the landing gear assembly 102, the kneel stop position 302 of the piston stroke 214 within the cylinder bore 210 relates to a kneeling condition 602 of the landing gear assembly 102 during ground operations of the aircraft 2400. In still another example of the landing gear assembly 102, the kneel stop assembly 106 is configured to permit the piston 212 to move from the kneel stop position 302 to the extended piston position 216 of the piston stroke 214 within the cylinder bore 210. In still yet another example of the landing gear assembly 102, the kneel stop assembly 106 is configured to selectively remove the kneel stop position 302 of the piston stroke 214 within the cylinder bore 210 to permit movement of the piston 212 to the retracted piston position 218 of the piston stroke 214.

In another example of the landing gear assembly 102, the kneel stop assembly 106 includes a kneel stop housing 1102, a kneel stop insert port 308 and a kneel stop withdraw port 312. The kneel stop housing 1102 secured to the exterior surface 220 of the actuator housing 202 of the retract actuator 104 in relation to the extended piston position 216 within the cylinder bore 210 of the retract actuator 104 and the retracted piston position 218 within the cylinder bore 210. The kneel stop housing 1102 includes a kneel stop distal end 1104 closer to the distal end 206 of the actuator housing 202 and a kneel stop proximal end 1106 closer to the proximal end 208 of the actuator housing 202. The kneel stop housing 1102 defines a cavity 304 between an interior surface 306 of the kneel stop housing 1102 and the exterior surface 220 of the actuator housing 202. The kneel stop insert port 308 disposed on the kneel stop housing 1102 to provide fluidic access to a kneel stop insert chamber 310 formed within the cavity 304. The kneel stop withdraw port 312 disposed on the kneel stop housing 1102 to provide fluidic access to a kneel stop withdraw chamber 314 formed within the cavity 304.

In a further example of the landing gear assembly 102, the kneel stop assembly 106 also includes at least one kneel stop segment 1108 disposed within the cavity 304 of the kneel stop housing 1102 at a predetermined point 1109 along the longitudinal axis 204 of the actuator housing 202. The predetermined point 1109 associated with the kneel stop position 302. The actuator housing 202 includes at least one kneel stop aperture 1110 extending through the actuator housing 202 to the cylinder bore 210. The at least one kneel stop aperture 1110 configured to receive at least a portion of the at least one kneel stop segment 1108. The at least one kneel stop segment 1108 configured for selective insertion into the at least one kneel stop aperture 1110 and configured for selective removal from the at least one kneel stop aperture 1110. In an even further example, the at least one kneel stop segment 1108 includes at least two kneel stop segments 1108 radially dispersed around the actuator housing 202 at the predetermined point 1109. In this example, the at least one kneel stop aperture 1110 includes at least two kneel stop apertures 1110 radially dispersed around the actuator housing 202 in relation to the at least two kneel stop segments 1108.

In another even further example of the landing gear assembly 102, the kneel stop assembly 106 also includes an upper biasing member 1112, an upper slider member 1114, a lower biasing member 1118 and a lower slider member 1120. The upper biasing member 1112 disposed within the cavity 304 between the kneel stop housing 1102 and the actuator housing 202 and proximate the kneel stop distal end 1104 of the kneel stop housing 1102. The upper slider member 1114 disposed within the cavity 304 between the kneel stop housing 1102 and the actuator housing 202 and between the upper biasing member 1112 and the at least one kneel stop segment 1108. The upper slider member 1114 includes a first portion of an upper slider exterior surface 1116 facing the interior surface 306 of the kneel stop housing 1102. The first portion of the upper slider exterior surface 1116 and an opposing portion of the interior surface 306 for the kneel stop housing 1102 are configured to form the kneel stop insert chamber 310. The upper biasing member 1112 configured to bias the upper slider member 1114 toward the at least one kneel stop segment 1108. The lower biasing member 1118 disposed within the cavity 304 between the kneel stop housing 1102 and the actuator housing 202 and proximate the kneel stop proximal end 1106 of the kneel stop housing 1102. The lower slider member 1120 disposed within the cavity 304 between the kneel stop housing 1102 and the actuator housing 202 and between the at least one kneel stop segment 1108 and the lower biasing member 1118. The lower slider member 1120 includes a first portion of a lower slider exterior surface 1122 facing the interior surface 306 of the kneel stop housing 1102. The first portion of the lower slider exterior surface 1122 and an opposing portion of the interior surface 306 for the kneel stop housing 1102 are configured to form the kneel stop withdraw chamber 314. The lower biasing member 1118 configured to bias the lower slider member 1120 toward the at least one kneel stop segment 1108.

Referring generally to FIGS. 1-11, 13-22 and 24, by way of examples, the present disclosure is directed to a method 1300, 1400, 1500, 1600, 1700, 1800, 1900, 2000, 2100, 2200 for kneeling a landing gear assembly 102 of an aircraft 2400. FIG. 1 discloses an example of a retract actuator assembly 100 for an example of the landing gear assembly 102. FIG. 2 shows a cross-sectional view of an example of a retract actuator 104 for the retract actuator assembly 100 of FIG. 1. FIG. 3 shows a cross-sectional view of an example of a kneel stop assembly 106 for the retract actuator assembly 100 of FIG. 1 in which kneel stop segments 1108 are inserted into the retract actuator 104 and the retract actuator 104 is in an extended position. FIG. 4 shows a functional diagram of the landing gear assembly 102 of FIG. 1 in which the landing gear assembly 102 is in an extended condition and the weight of the aircraft 2400 is on the wheels. FIG. 5 shows a cross-sectional view of an example of a kneel stop assembly 106 for the retract actuator assembly 100 of FIG. 1 in which the kneel stop segments 1108 are inserted into the retract actuator 104 and the retract actuator 104 is in a kneeled position.

FIG. 6 shows a functional diagram of the landing gear assembly 102 of FIG. 1 in which the landing gear assembly 102 is in a kneeled condition and the weight of the aircraft 2400 is on the wheels. FIG. 7 shows a cross-sectional view of an example of a kneel stop assembly 106 for the retract actuator assembly 100 of FIG. 1 in which the kneel stop segments 1108 are withdrawn from the retract actuator 104 and the retract actuator 104 is in a retracted position. FIG. 8 shows a functional diagram of the landing gear assembly 102 of FIG. 1 in which the landing gear assembly 102 is in a retracted condition and the aircraft 2400 is in flight. FIG. 9 shows a cross-sectional view of an example of a kneel stop assembly 106 for the retract actuator assembly 100 of FIG. 1 in which the kneel stop segments 1108 are withdrawn from the retract actuator 104 and the retract actuator 104 is in an extended position. FIG. 10 shows a functional diagram of the landing gear assembly 102 of FIG. 1 in which the landing gear assembly 102 is in an extended condition and the aircraft 2400 is in flight. FIG. 11 provides an exploded view of an example of the kneel stop assembly 106 of FIG. 3 in relation to an example of a retract actuator 104 for the retract actuator assembly 100 of FIG. 1.

Figure 13:
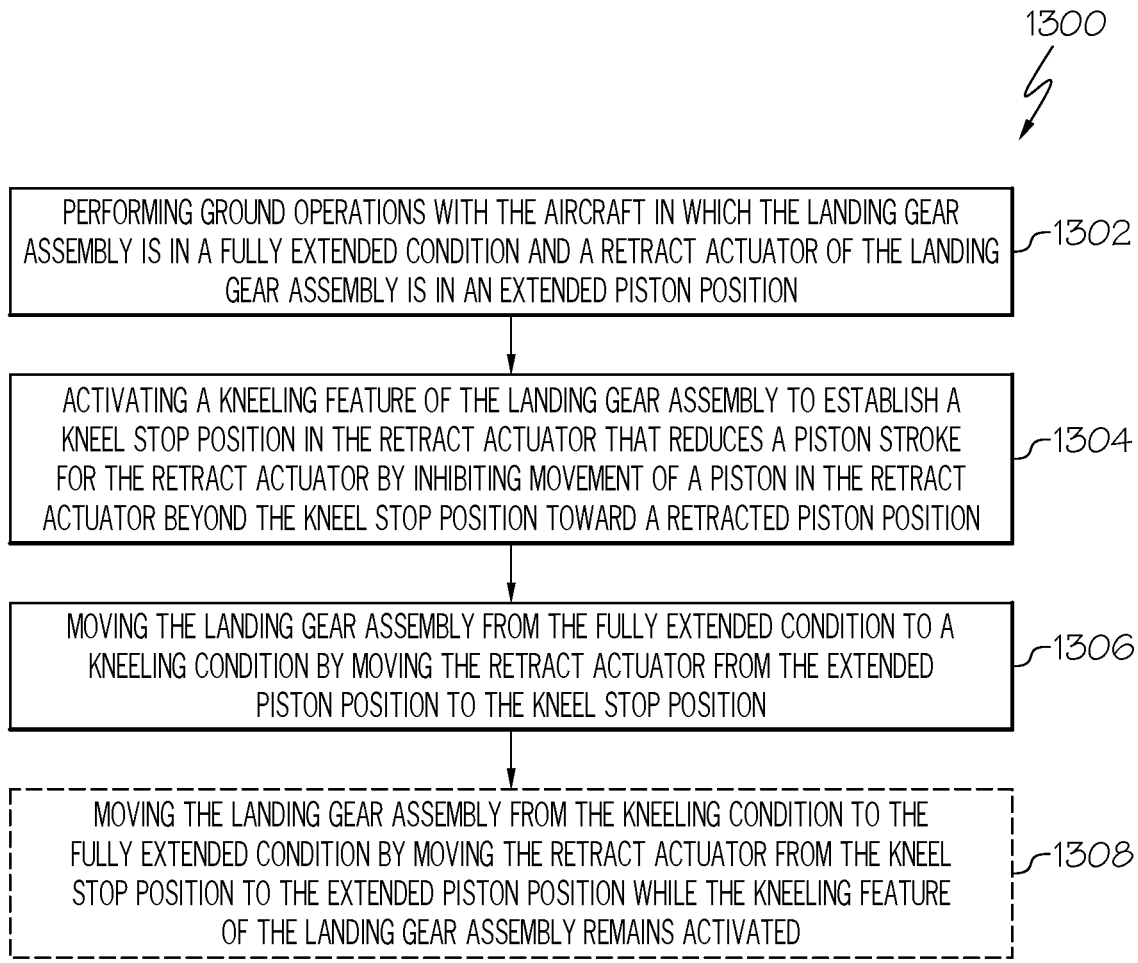
FIG. 13 provide a flow diagram of an example of a method for kneeling a landing gear assembly of an aircraft.
Figure 14:
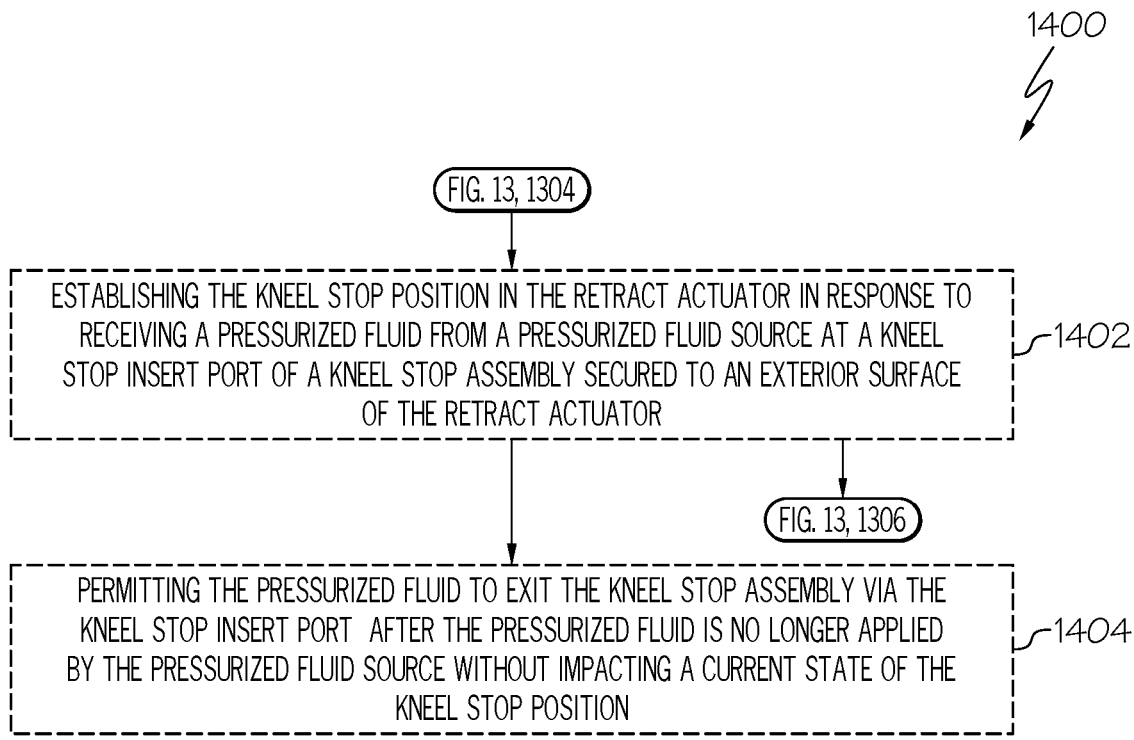
FIG. 14, in combination with FIG. 13, is a flow diagram of another example of a method for kneeling a landing gear assembly of an aircraft.
Figure 15:
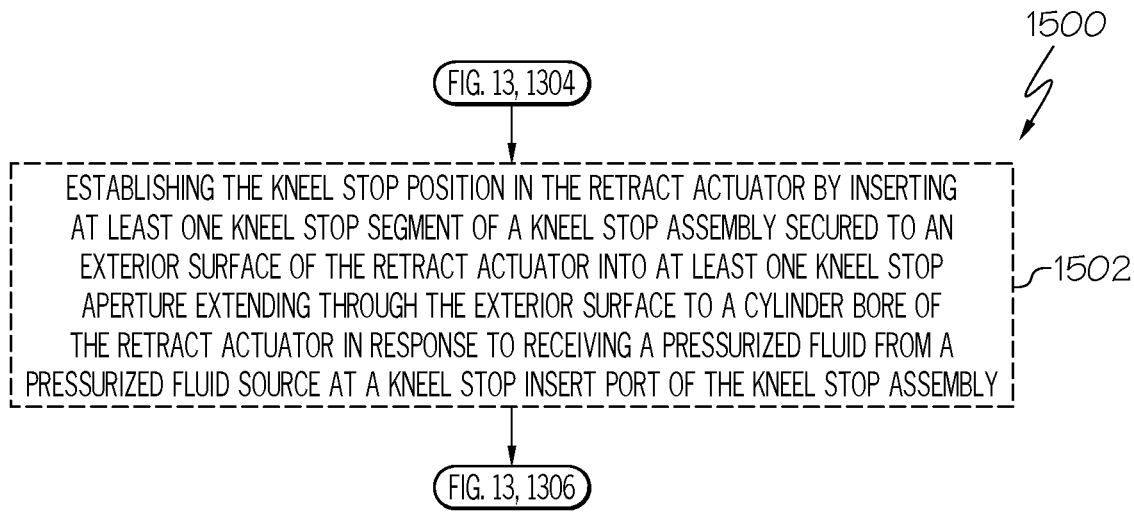
FIG. 15, in combination with FIG. 13, is a flow diagram of yet another example of a method for kneeling a landing gear assembly of an aircraft.
Figure 16:
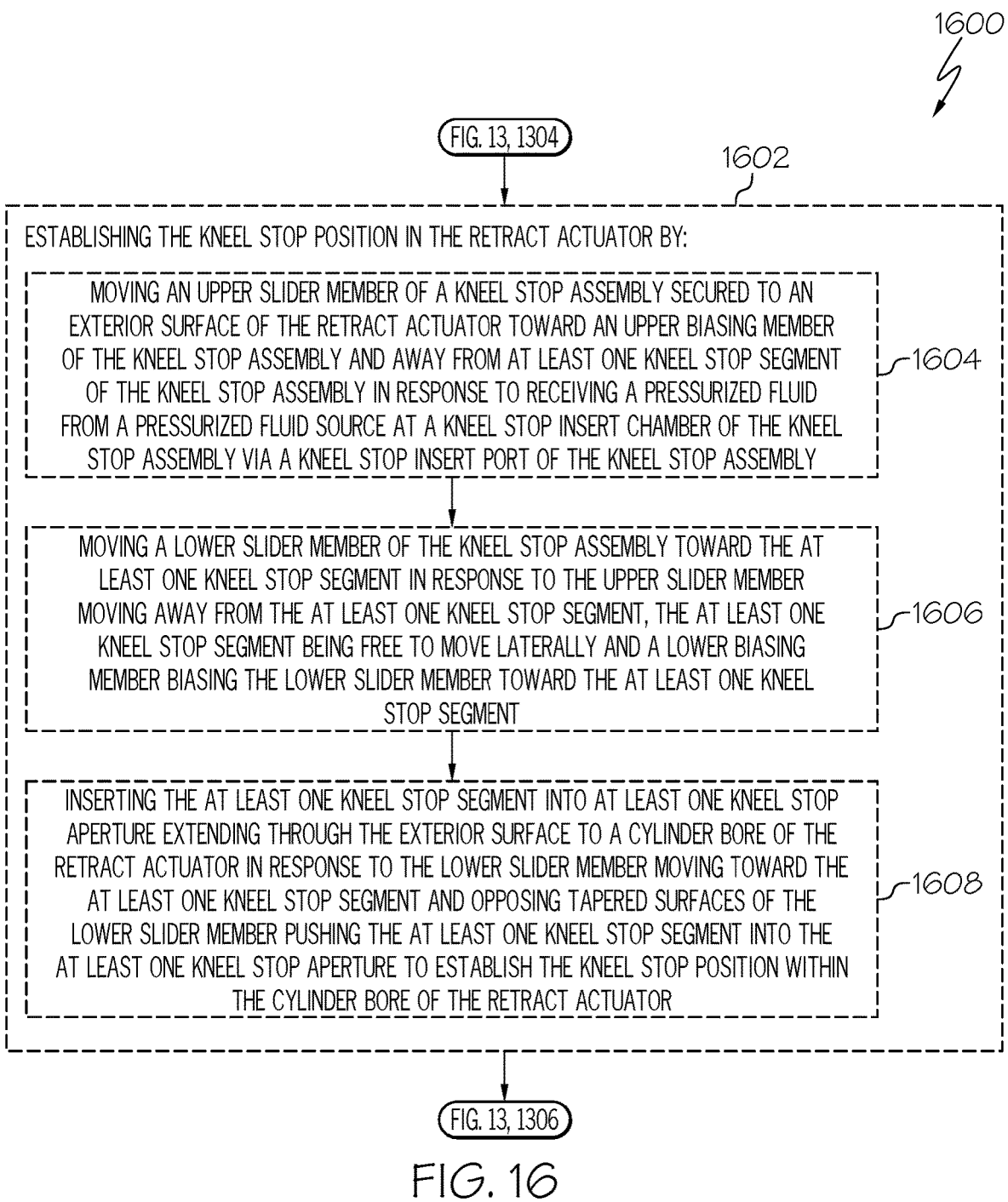
FIG. 16, in combination with FIG. 13, is a flow diagram of still another example of a method for kneeling a landing gear assembly of an aircraft.
Figure 17:
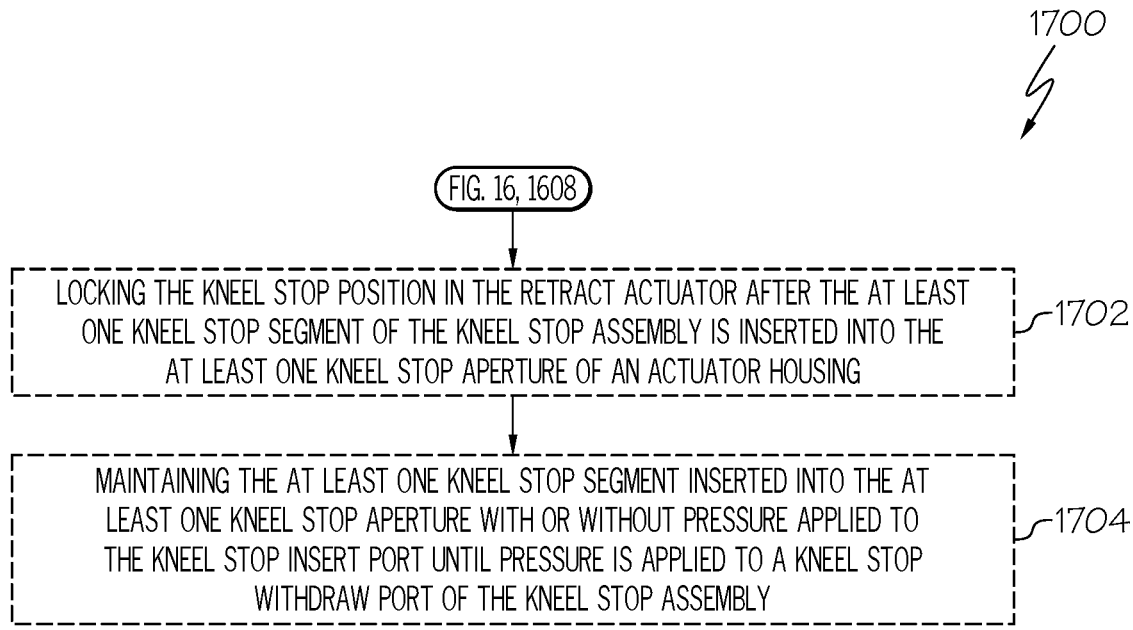
FIG. 17, in combination with FIGS. 13 and 16, is a flow diagram of still yet another example of a method for kneeling a landing gear assembly of an aircraft.
Figure 18:
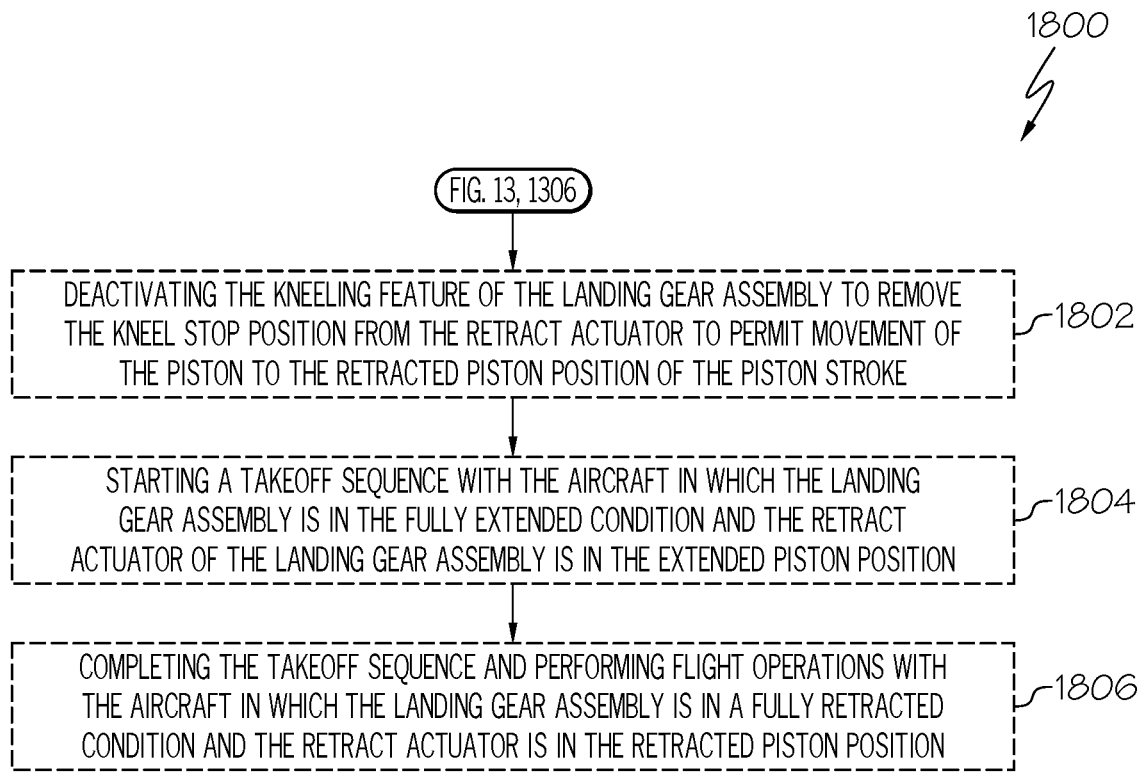
FIG. 18, in combination with FIG. 13, is a flow diagram of another example of a method for kneeling a landing gear assembly of an aircraft.
Figure 19:
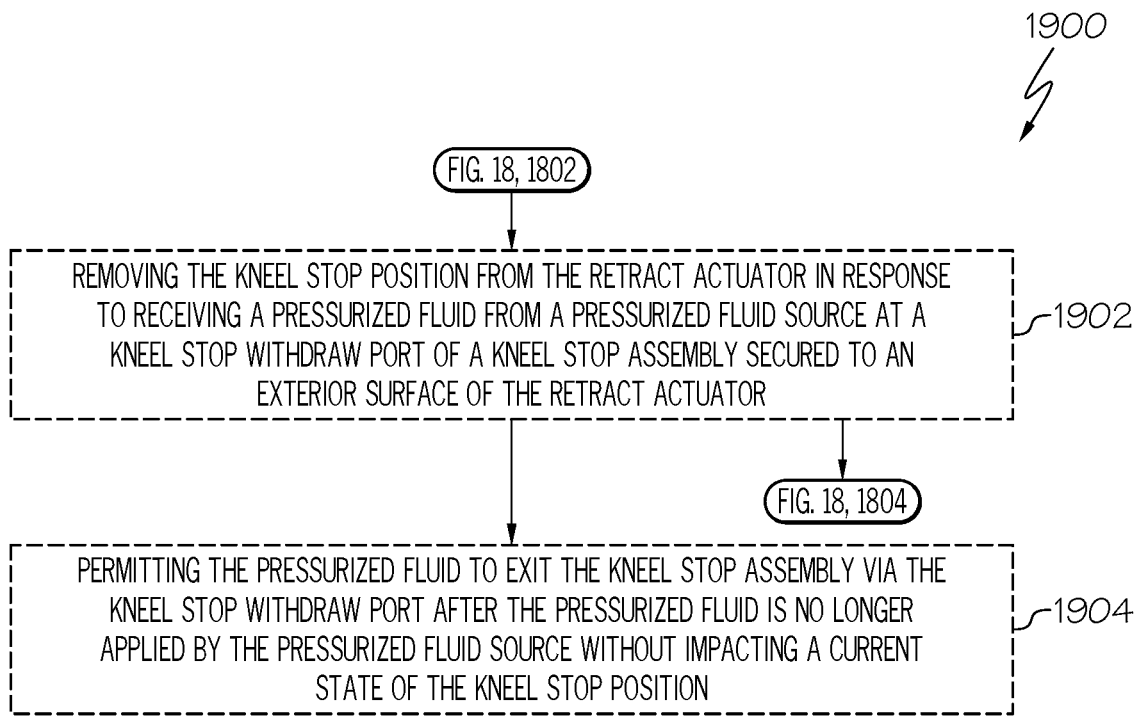
FIG. 19, in combination with FIGS. 13 and 18, is a flow diagram of yet another example of a method for kneeling a landing gear assembly of an aircraft.
Figure 20:
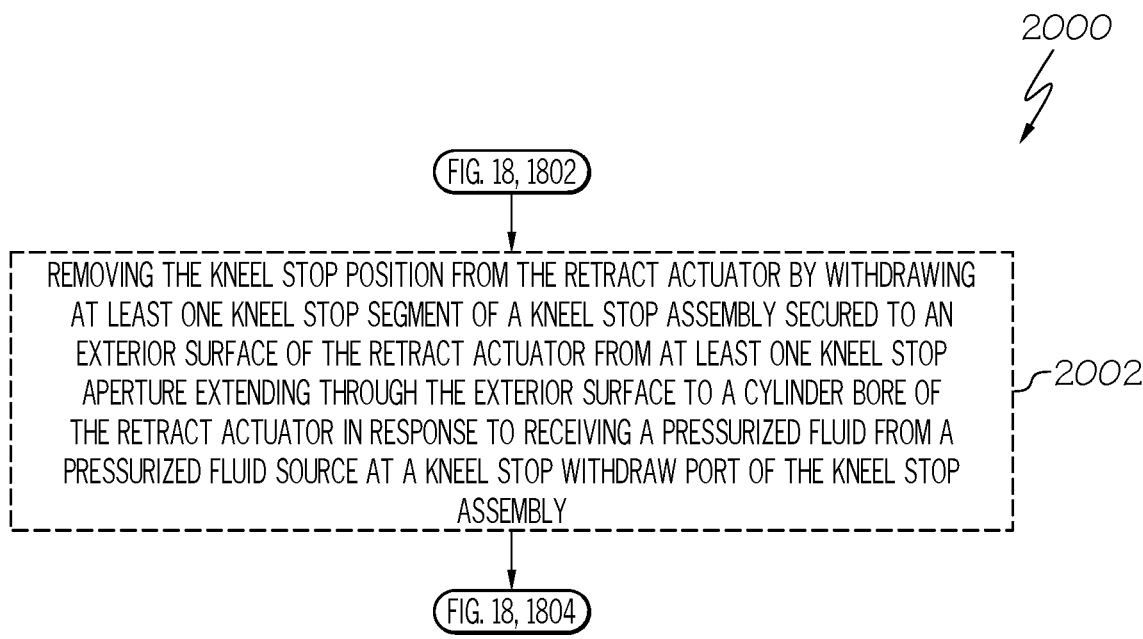
FIG. 20, in combination with FIGS. 13 and 18, is a flow diagram of still another example of a method for kneeling a landing gear assembly of an aircraft.
Figure 21:
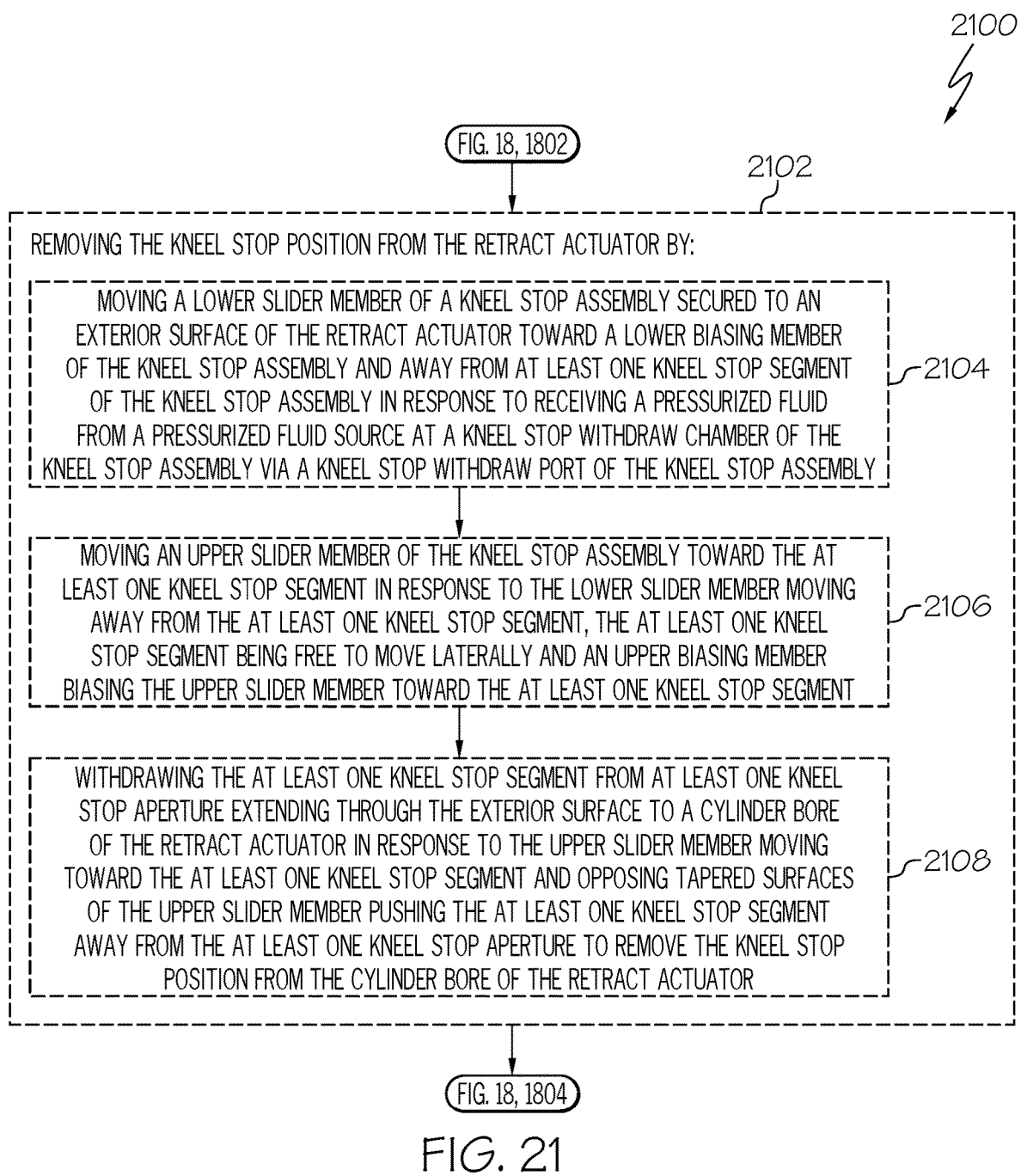
FIG. 21, in combination with FIGS. 13 and 18, is a flow diagram of still yet another example of a method for kneeling a landing gear assembly of an aircraft.
Figure 22:
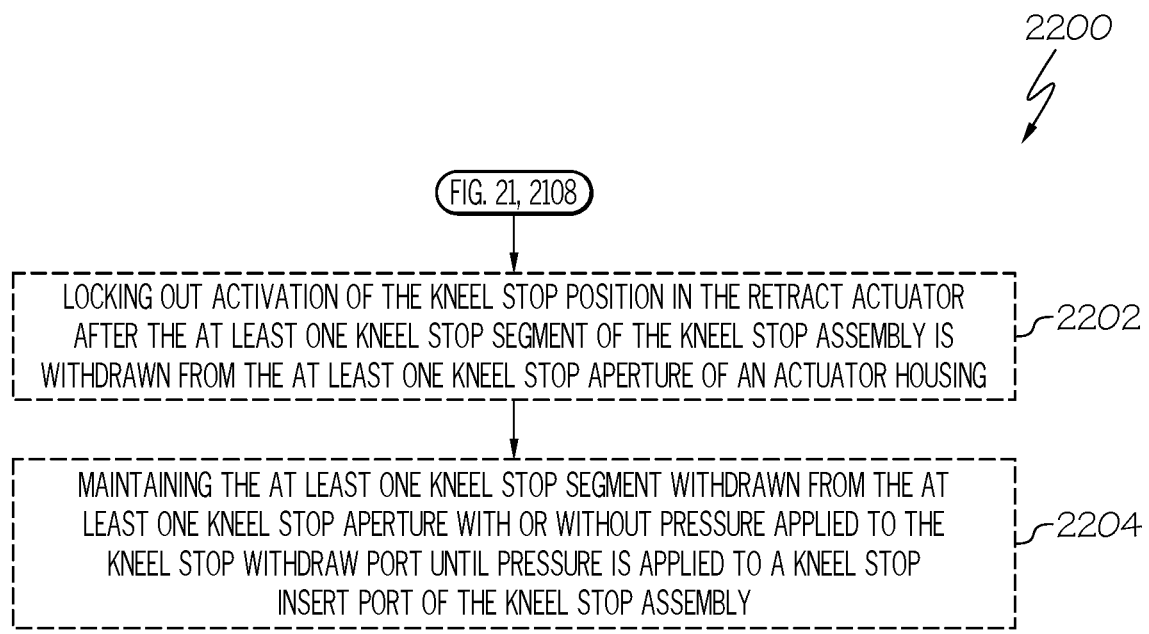
FIG. 22, in combination with FIGS. 13, 18 and 21, is a flow diagram of still another example of a method for kneeling a landing gear assembly of an aircraft.
Figure 23:
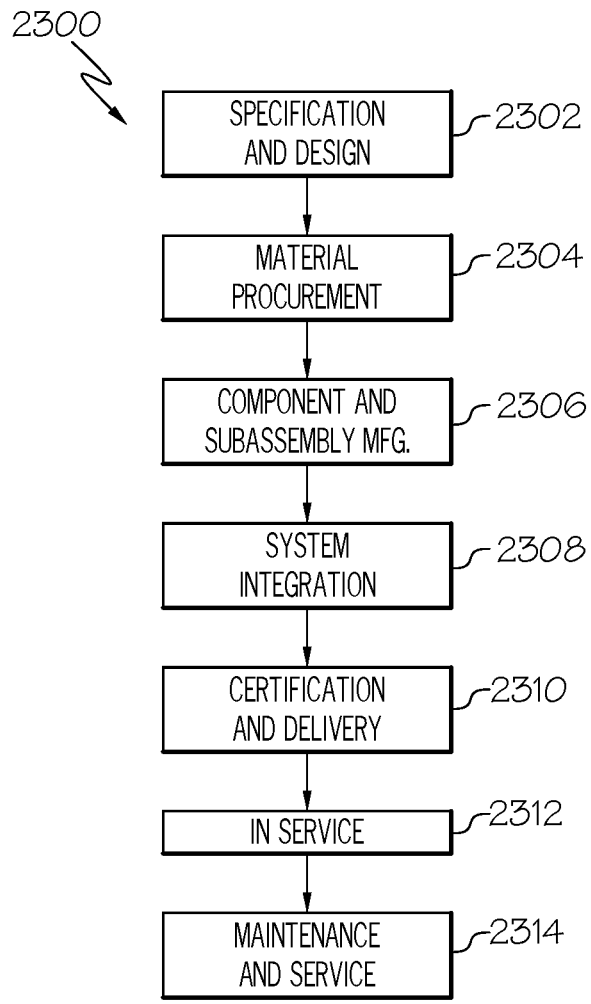
FIG. 23 is a block diagram of aircraft production and service methodology that implements one or more of the examples of methods for kneeling a landing gear assembly of an aircraft disclosed herein.

FIG. 13 discloses an example of the method 1300 for kneeling a landing gear assembly 102 of an aircraft 2400. FIG. 14, in combination with FIG. 13, discloses an example of the method 1400 for kneeling a landing gear assembly 102 of an aircraft 2400. FIG. 15, in combination with FIG. 13, discloses an example of the method 1500 for kneeling a landing gear assembly 102 of an aircraft 2400. FIG. 16, in combination with FIG. 13, discloses an example of the method 1600 for kneeling a landing gear assembly 102 of an aircraft 2400. FIG. 17, in combination with FIGS. 13 and 16, discloses an example of the method 1700 for kneeling a landing gear assembly 102 of an aircraft 2400. FIG. 18, in combination with FIG. 13, discloses an example of the method 1800 for kneeling a landing gear assembly 102 of an aircraft 2400. FIG. 19, in combination with FIGS. 13 and 18, discloses an example of the method 1900 for kneeling a landing gear assembly 102 of an aircraft 2400. FIG. 20, in combination with FIGS. 13 and 18, discloses an example of the method 2000 for kneeling a landing gear assembly 102 of an aircraft 2400. FIG. 21, in combination with FIGS. 13 and 18, discloses an example of the method 2100 for kneeling a landing gear assembly 102 of an aircraft 2400. FIG. 22, in combination with FIGS. 13, 18 and 21, discloses an example of the method 2200 for kneeling a landing gear assembly 102 of an aircraft 2400. FIG. 24 shows an aircraft 2400 that incorporates one or more examples of retract actuator assemblies 100 and landing gear assemblies 102 disclosed herein.

With reference again to FIGS. 1-3, 6, 10, 13 and 24, in one or more examples, a method 1300 (see FIG. 13) for kneeling a landing gear assembly 102 of an aircraft 2400 includes performing 1302 ground operations for the aircraft 2400 in which the landing gear assembly 102 is in a fully extended condition 1002 and a retract actuator 104 of the landing gear assembly 102 is in an extended piston position 216. At 1304, a kneeling feature of the landing gear assembly 102 is activated to establish a kneel stop position 302 in the retract actuator 104 that reduces a piston stroke 214 for the retract actuator 104 by inhibiting movement of a piston 212 in the retract actuator 104 beyond the kneel stop position 302 toward a retracted piston position 218. At 1306, the landing gear assembly 102 is moved from the fully extended condition 1002 to a kneeling condition 602 by moving the retract actuator 104 from the extended piston position 216 to the kneel stop position 302.

In another example of the method 1300, the extended piston position 216 of the piston stroke 214 within a cylinder bore 210 of the retract actuator 104 relates to the fully extended condition 1002 of the landing gear assembly 102 in conjunction with a landing sequence of the aircraft 2400. In yet another example of the method 1300, the retracted piston position 218 of the piston stroke 214 within a cylinder bore 210 of the retract actuator 104 relates to a fully retracted condition 802 of the landing gear assembly 102 in conjunction with a takeoff sequence of the aircraft 2400. In still another example of the method 1300, the kneel stop position 302 of the piston stroke 214 within a cylinder bore 210 of the retract actuator 104 relates to the kneeling condition 602 of the landing gear assembly 102 during ground operations of the aircraft 2400. In still yet another example, the method 1300 also includes moving 1308 the landing gear assembly 102 from the kneeling condition 602 to the fully extended condition 1002 by moving the retract actuator 104 from the kneel stop position 302 to the extended piston position 216 while the kneeling feature of the landing gear assembly 102 remains activated.

With reference again to FIGS. 1-3, 13, 14 and 24, in one or more examples, a method 1400 (see FIG. 14) for kneeling a landing gear assembly 102 of an aircraft 2400 includes the method 1300 of FIG. 13. The method 1400 continues from 1304 to 1402 where the kneel stop position 302 is established in the retract actuator 104 in response to receiving a pressurized fluid from a pressurized fluid source at a kneel stop insert port 308 of a kneel stop assembly 106 secured to an exterior surface 220 of the retract actuator 104. The method 1400 continues from 1402 to 1306 (see FIG. 13). In another example, the method also includes permitting 1404 the pressurized fluid to exit the kneel stop assembly 106 via the kneel stop insert port 308 after the pressurized fluid is no longer applied by the pressurized fluid source without impacting a current state of the kneel stop position 302.

With reference again to FIGS. 1-3, 11, 13, 15 and 24, in one or more examples, a method 1500 (see FIG. 15) for kneeling a landing gear assembly 102 of an aircraft 2400 includes the method 1300 of FIG. 13. The method 1500 continues from 1304 to 1502 where the kneel stop position 302 is established in the retract actuator 104 by inserting at least one kneel stop segment 1108 of a kneel stop assembly 106 secured to an exterior surface 220 of the retract actuator 104 into at least one kneel stop aperture 1110 extending through the exterior surface 220 to a cylinder bore 210 of the retract actuator 104 in response to receiving a pressurized fluid from a pressurized fluid source at a kneel stop insert port 308 of the kneel stop assembly 106. The method 1500 continues from 1502 to 1306 (see FIG. 13).

With reference again to FIGS. 1-3, 11, 13, 16 and 24, in one or more examples, a method 1600 (see FIG. 16) for kneeling a landing gear assembly 102 of an aircraft 2400 includes the method 1300 of FIG. 13. The method 1600 continues from 1304 to 1602 where the kneel stop position 302 is established in the retract actuator 104. At 1604, the establishing 1602 includes moving an upper slider member 1114 of a kneel stop assembly 106 secured to an exterior surface 220 of the retract actuator 104 toward an upper biasing member 1112 of the kneel stop assembly 106 and away from at least one kneel stop segment 1108 of the kneel stop assembly 106 in response to receiving a pressurized fluid from a pressurized fluid source at a kneel stop insert chamber 310 of the kneel stop assembly 106 via a kneel stop insert port 308 of the kneel stop assembly 106. After 1604, the at least one kneel stop segment 1108 is no longer locked and is free to move laterally between the interior surface 306 of the kneel stop housing 1102 and the exterior surface 220 of the actuator housing 202 after the upper slider member 1114 moves toward the upper biasing member 1112. At 1606, the establishing 1602 also includes moving a lower slider member 1120 of the kneel stop assembly 106 toward the at least one kneel stop segment 1108 in response to the upper slider member 1114 moving away from the at least one kneel stop segment 1108, the at least one kneel stop segment 1108 being free to move laterally and a lower biasing member 1118 biasing the lower slider member 1120 toward the at least one kneel stop segment 1108. At 1608, the establishing 1602 also includes inserting the at least one kneel stop segment 1108 into at least one kneel stop aperture 1110 extending through the exterior surface 220 to a cylinder bore 210 of the retract actuator 104 in response to the lower slider member 1120 moving toward the at least one kneel stop segment 1108 and opposing tapered surfaces of the lower slider member 1120 pushing the at least one kneel stop segment 1108 into the at least one kneel stop aperture 1110 to establish the kneel stop position 302 within the cylinder bore 210 of the retract actuator 104. The method 1600 continues from 1602 to 1306 (see FIG. 13).

With reference again to FIGS. 1-3, 11, 13, 16, 17 and 24, in one or more examples, a method 1700 (see FIG. 17) for kneeling a landing gear assembly 102 of an aircraft 2400 includes the methods 1300, 1600 of FIGS. 13 and 16. The method 1700 continues from 1608 to 1702 where the kneel stop position 302 in the retract actuator 104 is locked after the at least one kneel stop segment 1108 of the kneel stop assembly 106 is inserted into the at least one kneel stop aperture 1110 of an actuator housing 202. At 1704, the at least one kneel stop segment 1108 inserted into the at least one kneel stop aperture 1110 is maintained with or without pressure applied to the kneel stop insert port 308 until pressure is applied to a kneel stop withdraw port 312 of the kneel stop assembly 106.

With reference again to FIGS. 1-3, 10, 13, 18 and 24, in one or more examples, a method 1800 (see FIG. 18) for kneeling a landing gear assembly 102 of an aircraft 2400 includes the method 1300 of FIG. 13. The method 1800 continues from 1306 to 1802 where the kneeling feature of the landing gear assembly 102 is deactivated to remove the kneel stop position 302 from the retract actuator 104 to permit movement of the piston 212 to the retracted piston position 218 of the piston stroke 214. At 1804, a takeoff sequence for the aircraft 2400 is started in which the landing gear assembly 102 is in the fully extended condition 1002 and the retract actuator 104 of the landing gear assembly 102 is in the extended piston position 216. At 1806, the takeoff sequence is completed and flight operations for the aircraft 2400 are performed in which the landing gear assembly 102 is in a fully retracted condition 802 and the retract actuator 104 is in the retracted piston position 218.

With reference again to FIGS. 1-3, 13, 18, 19 and 24, in one or more examples, a method 1900 (see FIG. 19) for kneeling a landing gear assembly 102 of an aircraft 2400 includes the methods 1300, 1800 of FIGS. 13 and 18. The method 1900 continues from 1802 to 1902 where the kneel stop position 302 is removed from the retract actuator 104 in response to receiving a pressurized fluid from a pressurized fluid source at a kneel stop withdraw port 312 of a kneel stop assembly 106 secured to an exterior surface 220 of the retract actuator 104. The method 1900 continues from 1902 to 1804 (see FIG. 18). In another example, the method 1900 also includes permitting 1904 the pressurized fluid to exit the kneel stop assembly 106 via the kneel stop withdraw port 312 after the pressurized fluid is no longer applied by the pressurized fluid source without impacting a current state of the kneel stop position 302.

With reference again to FIGS. 1-3, 11, 13, 18, 20 and 24, in one or more examples, a method 2000 (see FIG. 20) for kneeling a landing gear assembly 102 of an aircraft 2400 includes the methods 1300, 1800 of FIGS. 13 and 18. The method 2000 continues from 1802 to 2002 where the kneel stop position 302 is removed from the retract actuator 104 by withdrawing at least one kneel stop segment 1108 of a kneel stop assembly 106 secured to an exterior surface 220 of the retract actuator 104 from at least one kneel stop aperture 1110 extending through the exterior surface 220 to a cylinder bore 210 of the retract actuator 104 in response to receiving a pressurized fluid from a pressurized fluid source at a kneel stop withdraw port 312 of the kneel stop assembly 106. The method 2000 continues from 2002 to 1804 (see FIG. 18).

With reference again to FIGS. 1-3, 11, 13, 18, 21 and 24, in one or more examples, a method 2100 (see FIG. 21) for kneeling a landing gear assembly 102 of an aircraft 2400 includes the methods 1300, 1800 of FIGS. 13 and 18. The method 2100 continues from 1802 to 2102 where the kneel stop position 302 is removed from the retract actuator 104. At 2104, the removing 2102 includes moving a lower slider member 1120 of a kneel stop assembly 106 secured to an exterior surface 220 of the retract actuator 104 toward a lower biasing member 1118 of the kneel stop assembly 106 and away from at least one kneel stop segment 1108 of the kneel stop assembly 106 in response to receiving a pressurized fluid from a pressurized fluid source at a kneel stop withdraw chamber 314 of the kneel stop assembly 106 via a kneel stop withdraw port 312 of the kneel stop assembly 106. The at least one kneel stop segment 1108 is no longer locked and free to move laterally between the interior surface 306 of the kneel stop housing 1102 and the exterior surface 220 of the actuator housing 202 after the lower slider member 1120 moves toward the lower biasing member 1118. At 2106, the removing 2102 also includes moving an upper slider member 1114 of the kneel stop assembly 106 toward the at least one kneel stop segment 1108 in response to the lower slider member 1120 moving away from the at least one kneel stop segment 1108, the at least one kneel stop segment 1108 being free to move laterally and an upper biasing member 1112 biasing the upper slider member 1114 toward the at least one kneel stop segment 1108. At 2108, the removing 2102 also includes withdrawing the at least one kneel stop segment 1108 from at least one kneel stop aperture 1110 extending through the exterior surface 220 to a cylinder bore 210 of the retract actuator 104 in response to the upper slider member 1114 moving toward the at least one kneel stop segment 1108 and opposing tapered surfaces of the upper slider member 1114 pushing the at least one kneel stop segment 1108 away from the at least one kneel stop aperture 1110 to remove the kneel stop position 302 from the cylinder bore 210 of the retract actuator 104.

With reference again to FIGS. 1-3, 11, 13, 18, 21, 22 and 24, in one or more examples, a method 2200 (see FIG. 22) for kneeling a landing gear assembly 102 of an aircraft 2400 includes the methods 1300, 1800, 2100 of FIGS. 13, 18 and 21. The method 2200 continues from 2108 to 2202 where the kneel stop position 302 in the retract actuator 104 is locked out after the at least one kneel stop segment 1108 of the kneel stop assembly 106 is withdrawn from the at least one kneel stop aperture 1110 of an actuator housing 202. At 2204, the at least one kneel stop segment 1108 withdrawn from the at least one kneel stop aperture 1110 is maintained with or without pressure applied to the kneel stop withdraw port 312 until pressure is applied to a kneel stop insert port 308 of the kneel stop assembly 106.

Examples of the retract actuator assembly 100, landing gear assembly 102 and methods 1300, 1400, 1500, 1600, 1700, 1800, 1900, 2000, 2100, 2200 for kneeling a landing gear assembly 102 of an aircraft 2400 may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of kneeling in the manufacture and/or operation of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1-11, 12A-C and 24, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1-11, 12A-C and 24, referred to above, need be included in every example and not all elements, features and/or components described herein are necessarily depicted in each illustrative example. Accordingly, some of the elements, features and/or components described and illustrated in FIGS. 1-11, 12A-C and 24 may be combined in various ways without the need to include other features described and illustrated in FIGS. 1-11, 12A-C and 24, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1-11, 12A-C and 24, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1-11, 12A-C and 24 and such elements, features and/or components may not be discussed in detail herein with reference to each of FIGS. 1-11, 12A-C and 24. Similarly, all elements, features and/or components may not be labeled in each of FIGS. 1-11, 12A-C and 24, but reference numerals associated therewith may be utilized herein for consistency.

In FIGS. 12-23, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 12-23 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Examples of the subject matter disclosed herein may be described in the context of aircraft manufacturing and service method 2300 as shown in FIG. 15 and aircraft 2400 as shown in FIG. 16. In one or more examples, the disclosed methods and systems for associating test data for a part under test with an end item coordinate system may be used in aircraft manufacturing. During pre-production, the service method 2300 may include specification and design (block 2302) of aircraft 2400 and material procurement (block 2304). During production, component and subassembly manufacturing (block 2306) and system integration (block 2308) of aircraft 2400 may take place. Thereafter, aircraft 2400 may go through certification and delivery (block 2310) to be placed in service (block 2312). While in service, aircraft 2400 may be scheduled for routine maintenance and service (block 2314). Routine maintenance and service may include modification, reconfiguration, refurbishment, etc. of one or more systems of aircraft 2400.

Each of the processes of the service method 2300 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 16, aircraft 2400 produced by the service method 2300 may include airframe 2402 with a plurality of high-level systems 2404 and interior 2406. Examples of high-level systems 2404 include one or more of propulsion system 2408, electrical system 2410, hydraulic system 2412 and environmental system 2414. Any number of other systems may be included. Although an aerospace example is shown, the principles disclosed herein may be applied to other industries, such as the automotive industry. Accordingly, in addition to aircraft 2400, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 2300. For example, components or subassemblies corresponding to component and subassembly manufacturing (block 2306) may be fabricated or manufactured in a manner similar to components or subassemblies produced while aircraft 2400 is in service (block 2312). Also, one or more examples of the system(s), method(s), or combination thereof may be utilized during production stages (block 2306 and block 2308), for example, by substantially expediting assembly of or reducing the cost of aircraft 2400. Similarly, one or more examples of the system or method realizations, or a combination thereof, may be utilized, for example and without limitation, while aircraft 2400 is in service (block 2312) and/or during maintenance and service (block 2314).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the retract actuator assemblies 100, landing gear assemblies 102 and methods 1300, 1400, 1500, 1600, 1700, 1800, 1900, 2000, 2100, 2200 for kneeling a landing gear assembly 102 of an aircraft 2400 have been shown and described, modifications may occur to those skilled in the art upon reading the specification. The present application includes such modifications and is limited only by the scope of the claims.

What is claimed is:

1. A retract actuator assembly for a landing gear assembly of an aircraft, comprising:
    a retract actuator, comprising:
        an actuator housing defining a longitudinal axis extending through a distal end and a proximal end, the actuator housing comprising a cylinder bore along the longitudinal axis; and
        a piston disposed within the cylinder bore and configured to move within the cylinder bore along the longitudinal axis, the cylinder bore defining a piston stroke within the actuator housing that defines limits for movement of the piston, the piston stroke comprising an extended piston position relating to the distal end of the actuator housing and a retracted piston position relating to the proximal end of the actuator housing; and
    a kneel stop assembly secured to an exterior surface of the actuator housing in relation to the extended piston position within the cylinder bore and the retracted piston position within the cylinder bore, the kneel stop assembly configured to selectively establish a kneel stop position within the cylinder bore to reduce the piston stroke by inhibiting movement of the piston to the retracted piston position.

2. The retract actuator assembly of claim 1, further comprising:
    a shock absorber secured to the proximal end of the actuator housing such that the shock absorber and retract actuator are aligned along the longitudinal axis of the actuator housing to form an inline shock absorber actuator, the shock absorber configured to pivotally attach to a trailing arm of the landing gear assembly.

3. The retract actuator assembly of claim 1 wherein the kneel stop assembly is configured to permit the piston to move from the kneel stop position to the extended piston position of the piston stroke within the cylinder bore.

4. The retract actuator assembly of claim 1 wherein the kneel stop assembly is configured to selectively remove the kneel stop position of the piston stroke within the cylinder bore to permit movement of the piston to the retracted piston position of the piston stroke.

5. The retract actuator assembly of claim 1 wherein the piston defines a rod chamber in the cylinder bore relating to the distal end of the actuator housing and a piston chamber in the cylinder bore relating to the proximal end of the actuator housing, the retract actuator further comprising:
    a piston rod disposed within the rod chamber and comprising a first end attached to the piston and a second end extending through a sealed aperture at the distal end of the actuator housing.

6. The retract actuator assembly of claim 5 wherein the second end of the piston rod is configured to pivotally attach to a fixed point on the aircraft, the retract actuator assembly further comprising:
    a shock absorber secured to the proximal end of the actuator housing such that the shock absorber and retract actuator are aligned along the longitudinal axis of the actuator housing to form an inline shock absorber actuator, the shock absorber configured to pivotally attach to a trailing arm of the landing gear assembly.

7. The retract actuator assembly of claim 5 wherein the proximal end of the actuator housing is configured to pivotally attach to a fixed point on the aircraft, the retract actuator assembly further comprising:
    a shock absorber mechanically linked to the second end of the piston rod, the shock absorber configured to pivotally attach to a trailing arm of the landing gear assembly.

8. The retract actuator assembly of claim 5, the retract actuator further comprising:
    a rod hydraulic port disposed proximate the distal end of the actuator housing to provide fluidic access to the rod chamber; and
    a piston hydraulic port disposed proximate the proximal end of the actuator housing to provide fluidic access to the piston chamber.

9. The retract actuator assembly of claim 1, the kneel stop assembly comprising:
- a kneel stop housing secured to the exterior surface of the actuator housing of the retract actuator in relation to the extended piston position within the cylinder bore of the retract actuator and the retracted piston position within the cylinder bore, the kneel stop housing comprising a kneel stop distal end closer to the distal end of the actuator housing and a kneel stop proximal end closer to the proximal end of the actuator housing, the kneel stop housing defining a cavity between an interior surface of the kneel stop housing and the exterior surface of the actuator housing;
- a kneel stop insert port disposed on the kneel stop housing to provide fluidic access to a kneel stop insert chamber formed within the cavity; and
- a kneel stop withdraw port disposed on the kneel stop housing to provide fluidic access to a kneel stop withdraw chamber formed within the cavity.

10. The retract actuator assembly of claim 9 wherein the kneel stop insert port is configured to receive a pressurized fluid from a pressurized fluid source and the kneel stop assembly is configured to establish the kneel stop position in response to receipt of the pressurized fluid at the kneel stop insert port.

11. The retract actuator assembly of claim 9 wherein the kneel stop withdraw port is configured to receive a pressurized fluid from a pressurized fluid source and the kneel stop assembly is configured to remove the kneel stop position in response to receipt of the pressurized fluid at the kneel stop withdraw port.

12. The retract actuator assembly of claim 9, the kneel stop assembly further comprising:
- at least one kneel stop segment disposed within the cavity of the kneel stop housing at a predetermined point along the longitudinal axis of the actuator housing, the predetermined point associated with the kneel stop position, the actuator housing comprising at least one kneel stop aperture extending through the actuator housing to the cylinder bore, the at least one kneel stop aperture configured to receive at least a portion of the at least one kneel stop segment, the at least one kneel stop segment configured for selective insertion into the at least one kneel stop aperture and configured for selective removal from the at least one kneel stop aperture.

13. The retract actuator assembly of claim 12 wherein the kneel stop insert port is configured to receive a pressurized fluid from a pressurized fluid source and the kneel stop assembly is configured to insert the at least one kneel stop segment into the at least one kneel stop aperture of the actuator housing to establish the kneel stop position in response to receipt of the pressurized fluid at the kneel stop insert port.

14. The retract actuator assembly of claim 12 wherein the kneel stop withdraw port is configured to receive a pressurized fluid from a pressurized fluid source and the kneel stop assembly is configured to withdraw the at least one kneel stop segment from the at least one kneel stop aperture of the actuator housing to remove the kneel stop position in response to receipt of the pressurized fluid at the kneel stop withdraw port.

15. The retract actuator assembly of claim 12, the kneel stop assembly further comprising:
- an upper biasing member disposed within the cavity between the kneel stop housing and the actuator housing and proximate the kneel stop distal end of the kneel stop housing;
- an upper slider member disposed within the cavity between the kneel stop housing and the actuator housing and between the upper biasing member and the at least one kneel stop segment, the upper slider member comprising a first portion of an upper slider exterior surface facing the interior surface of the kneel stop housing, the first portion of the upper slider exterior surface and an opposing portion of the interior surface for the kneel stop housing are configured to form the kneel stop insert chamber, the upper biasing member configured to bias the upper slider member toward the at least one kneel stop segment;
- a lower biasing member disposed within the cavity between the kneel stop housing and the actuator housing and proximate the kneel stop proximal end of the kneel stop housing; and
- a lower slider member disposed within the cavity between the kneel stop housing and the actuator housing and between the at least one kneel stop segment and the lower biasing member, the lower slider member comprising a first portion of a lower slider exterior surface facing the interior surface of the kneel stop housing, the first portion of the lower slider exterior surface and an opposing portion of the interior surface for the kneel stop housing are configured to form the kneel stop withdraw chamber, the lower biasing member configured to bias the lower slider member toward the at least one kneel stop segment.

16. The retract actuator assembly of claim 15, the upper slider member further comprising:
- a second portion of the upper slider exterior surface in opposing geometric relation with an upper surface of the at least one kneel stop segment; and
- a third portion of the upper slider exterior surface adjacent to a corresponding portion of the exterior surface of the actuator housing,
- wherein the second portion of the upper slider exterior surface rises at a predetermined angle from the third portion of the upper slider exterior surface to the first portion of the upper slider exterior surface to facilitate withdrawing the at least one kneel stop segment from the at least one kneel stop aperture of the actuator housing,
- wherein the first portion of the upper slider exterior surface and the third portion of the upper slider exterior surface are configured to slide between the at least one kneel stop segment and the exterior surface of the actuator housing in response to application of pressure at the kneel stop withdraw port to block the at least one kneel stop segment from being inserted into the at least one kneel stop aperture.

17. The retract actuator assembly of claim 15, the lower slider member further comprising:
- a second portion of the lower slider exterior surface in opposing geometric relation with a lower surface of the at least one kneel stop segment; and
- a third portion of the lower slider exterior surface adjacent to a corresponding portion of the interior surface of the kneel stop housing,
- wherein the second portion of the lower slider exterior surface falls at a predetermined angle from the first portion of the lower slider exterior surface to the third portion of the lower slider exterior surface to facilitate inserting the at least one kneel stop segment into the at least one kneel stop aperture of the actuator housing, wherein the first portion of the lower slider exterior surface and the third portion of the lower slider exterior surface are configured to slide between the at least one kneel stop segment and the interior surface of the kneel stop housing in response to application of pressure at the kneel stop insert port to block the at least one kneel stop segment from being withdrawn from the at least one kneel stop aperture.

18. The retract actuator assembly of claim 15 wherein the kneel stop insert port is configured to receive a pressurized fluid from a pressurized fluid source and to provide the pressurized fluid to the kneel stop insert chamber, wherein the kneel stop assembly is configured to move the upper slider member toward the upper biasing member and away from the at least one kneel stop segment in response to receipt of the pressurized fluid by the kneel stop insert chamber, wherein the kneel stop assembly is configured to move the lower slider member toward the at least one kneel stop segment in response to the upper slider member moving away from the at least one kneel stop segment and the lower biasing member biasing the lower slider member toward the at least one kneel stop segment, wherein the kneel stop assembly is configured to insert the at least one kneel stop segment into the at least one kneel stop aperture of the actuator housing in response to the lower slider member moving toward the at least one kneel stop segment and pushing the at least one kneel stop segment into the at least one kneel stop aperture to establish the kneel stop position within the cylinder bore of the retract actuator.

19. A landing gear assembly for an aircraft, comprising:
a retract actuator, comprising:
an actuator housing defining a longitudinal axis extending through a distal end and a proximal end, the actuator housing comprising a cylinder bore along the longitudinal axis; and
a piston disposed within the cylinder bore and configured to move within the cylinder bore along the longitudinal axis, the cylinder bore defining a piston stroke within the actuator housing that defines limits for movement of the piston, the piston stroke comprising an extended piston position relating to the distal end of the actuator housing and a retracted piston position relating to the proximal end of the actuator housing;
a kneel stop assembly secured to an exterior surface of the actuator housing in relation to the extended piston position within the cylinder bore and the retracted piston position within the cylinder bore, the kneel stop assembly configured to selectively establish a kneel stop position within the cylinder bore to reduce the piston stroke by inhibiting movement of the piston to the retracted piston position;
a trailing arm comprising an arm proximal end and an arm distal end, the arm distal end configured to pivotally attach to a fixed point on the aircraft, the arm proximal end configured to attach to a surface contact assembly; and
a shock absorber mechanically linked to the retract actuator and configured to pivotally attach to the trailing arm.

20. A method for kneeling a landing gear assembly of an aircraft, comprising:
performing ground operations for the aircraft in which the landing gear assembly is in a fully extended condition and a retract actuator of the landing gear assembly is in an extended piston position;
activating a kneeling feature of the landing gear assembly to establish a kneel stop position in the retract actuator that reduces a piston stroke for the retract actuator inhibiting movement of a piston in the retract actuator beyond the kneel stop position toward a retracted piston position; establishing the kneel stop position in the retract actuator in response to receiving a pressurized fluid from a pressurized fluid source at a kneel stop insert port of the kneel stop assembly;
moving the landing gear assembly from the fully extended condition to a kneeling condition by moving the retract actuator from the extended piston position to the kneel stop position;
wherein a kneel stop assembly is secured to an exterior surface of the retract actuator.

* * * * *